United States Patent
Nguyen-Tuong et al.

(10) Patent No.: US 10,382,448 B2
(45) Date of Patent: *Aug. 13, 2019

(54) METHODS, SYSTEMS AND COMPUTER READABLE MEDIA FOR DETECTING COMMAND INJECTION ATTACKS

(71) Applicant: University of Virginia Patent Foundation, Charlottesville, VA (US)

(72) Inventors: Anh Nguyen-Tuong, Charlottesville, VA (US); Jack W. Davidson, Barboursville, VA (US); Michele Co, Charlottesville, VA (US); Jason D. Hiser, Charlottesville, VA (US); John C. Knight, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 67 days.

This patent is subject to a terminal disclaimer.

(21) Appl. No.: 15/492,264

(22) Filed: Apr. 20, 2017

(65) Prior Publication Data

US 2019/0199730 A1    Jun. 27, 2019

Related U.S. Application Data

(63) Continuation of application No. 14/442,859, filed as application No. PCT/US2013/070180 on Nov. 14, 2013, now Pat. No. 9,635,033.

(60) Provisional application No. 61/726,353, filed on Nov. 14, 2012.

(51) Int. Cl.
*H04L 29/06* (2006.01)
*G06F 21/55* (2013.01)
*G06F 21/57* (2013.01)
*G06F 21/51* (2013.01)
*G06F 17/24* (2006.01)

(52) U.S. Cl.
CPC .......... *H04L 63/105* (2013.01); *G06F 17/241* (2013.01); *G06F 21/51* (2013.01); *G06F 21/554* (2013.01); *G06F 21/57* (2013.01); *H04L 63/1416* (2013.01); *H04L 63/1466* (2013.01)

(58) Field of Classification Search
CPC ...................................................... G06F 21/51
See application file for complete search history.

(56) References Cited

U.S. PATENT DOCUMENTS

| 8,806,607 | B2 * | 8/2014 | Archer | H04L 63/1416 726/13 |
| 2006/0236100 | A1 * | 10/2006 | Baskaran | G06F 21/51 713/165 |
| 2011/0035733 | A1 * | 2/2011 | Horning | G06F 21/14 717/140 |
| 2011/0307451 | A1 * | 12/2011 | El Haddi | G06F 17/30073 707/673 |

(Continued)

*Primary Examiner* — Morshed Mehedi
(74) *Attorney, Agent, or Firm* — Robert J. Decker

(57) ABSTRACT

Methods and systems are described for detecting command injection attacks. A positive, taint inference method includes receiving signature fragments on one hand, converting command injection instructions into command fragments on another hand, thus identifying potential attacks upon the condition that a command injection instruction includes critical untrusted parts by using signature fragments. A system detects command injection attacks using this kind of method, and remediates and rejects potential attacks.

69 Claims, 16 Drawing Sheets

(56) References Cited

U.S. PATENT DOCUMENTS

2012/0117644 A1\* 5/2012 Soeder ................ G06F 21/554
                                                    726/22
2014/0215631 A1\* 7/2014 Tao .................... H04L 63/1441
                                                    726/25

\* cited by examiner

```
/bin/cat README
TTTTTTTTTTUUUUUU
CCCCCCCC--------
```

FIG. 3A

```
/bin/cat README; rm -fr *
TTTTTTTTTTUUUUUUUUUUUUUUUU
CCCCCCCC-------C-CC-CCC--
               * ** ***
```

FIG. 3B

```
3: Usage: spamass-milter -p socket
   [-b]-B bucket] [-d xx[,yy...]]
   [-D host]
11: popen failed(%s). Will not send a copy to spambucket
33: recipients; spamc gets default username
34: ). Will not send a copy to spambucket
46: Could not extract score from <%s>
56: error. could not replace body.
57: Could not extract score from <
173: popen failed(
273: hX
274: hx
279: h8
281: h@
282: h(
287: ><
286: @+
288: z
304: 0
305: 8
306: @
307: (
308: \
309: .
310: /
311: :
312: '
313: _
314: >
315: `
```

FIG. 4

| |
|---|
| `<commandName>` |
| `; [\s] <commandName>` |
| `$ (<commandName>` |
| `\|\| [\s] <commandName>` |
| `&& [\s] <commandName>` |
| `` `<commandName> `` |
| `<environmentVar> [\s]=` |
| `-<optionFlags>` |
| `--<optionFlags>` |

FIG. 5

```
/bin/cat README; rm -fr  *
TTTTTTTTUUUUUUUUUUUUUU
CCCCCCCC    C CC CCC
```

FIG. 6

| BENCHMARK TYPE | BENCHMARK | NATIVE (ms ± 95% CI) | S3 (ms ± 95% CI) | ABSOLUTE DIFF. (ms) | % DIFFERENCE |
|---|---|---|---|---|---|
| MITRE SEEDED | C-C078-NGIN-04-DT03-02 | 10.6 ± 1.5 | 10.8 ± 1.8 | 0.2* | 2.1%* |
| MITRE SEEDED | C-C078-CHER-04-DF09-02 | 11.7 ± 3.3 | 11.5 ± 1.4 | -0.2* | -1.5%* |
| REAL WORLD | SPAMASS-MILTER 0.3.1 | 87 ± 70 | 82 ± 43 | -4.4* | -5%* |
| REAL WORLD | cbrPager 0.9.16 | 121.3 ± 11.6 | 121.2 ± 9.0 | -0.1* | -0.1%* |
| MICRO | ECHO (SYSTEM) | 1,126 ± 18 | 1,222 ± 5 | 96 | 8.4% |
| MICRO | ECHO (POPEN) | 1,236 ± 12 | 1,240 ± 6 | 4 | 0.32% |
| MICRO | ECHO (EXECV) | 1,243 ± 4 | 1,514 ± 11 | 271 | 22% |
| MICRO | BZIP2 (SYSTEM) | 1,377 ± 13 | 1,380 ± 14 | 2.8 | 0.2% |
| MICRO | BZIP2 (POPEN) | 1,379 ± 12 | 1,381 ± 12 | 3.0 | 0.2% |
| MICRO | BZIP2 (EXECV) | 1,366 ± 14 | 1,373 ± 13 | 7.2 | 0.5% |

FIG. 15

| BENCHMARK | SIZE (KiB) | TOTAL (s) | EXTRACTION (s) |
|---|---|---|---|
| SPAMASS-MILTER 0.3.1 | 142 | 17.3 | 0.60 |
| cbrPager 0.9.16 | 198 | 25.8 | 0.69 |
| C-C078-NGIN-04-DT03-02 | 708 | 238.6 | 8.3 |
| C-C078-CHER-04-DF09-02 | 548 | 224.2 | 4.8 |

FIG. 16

METHODS, SYSTEMS AND COMPUTER READABLE MEDIA FOR DETECTING COMMAND INJECTION ATTACKS

RELATED APPLICATIONS

The present application is a continuation application under 35 U.S.C. § 120 of U.S. patent application Ser. No. 14/442,859, filed May 14, 2015, which is a national stage filing of International Application No. PCT/US2013/070180, filed Nov. 14, 2013, which claims priority under 35 U.S.C. § 119(e) from U.S. Provisional Application Ser. No. 61/726,353, filed Nov. 14, 2012, entitled "Method and System for Securing Applications Against Command Injection Attacks," the disclosures of which are hereby incorporated by reference herein in their entirety.

STATEMENT OF GOVERNMENT INTEREST

This invention was made with government support under Grant No. FA8650-10-C-7025, awarded by the Office of U.S. Air Force. The government has certain rights in the invention.

TECHNICAL FIELD

The present invention relates generally to the field of computer system security. More specifically, providing a system and method for detecting and mitigating command injection attacks from occurring on a network, system, device, or media.

BACKGROUND

Command injection attacks exploit flaws in software. The present inventors recognize that one solution to prevent such attacks would be to avoid software flaws by using safe programming practices or programming constructs that do not allow such flaws. While this approach may be technically feasible, in many instances it is not practical. First, it would be impractical to redesign or re-implement the large body of legacy software that already exists. Second, even for newly-developed software, time-to-market pressure favors the quick delivery of new features over careful security considerations. Third, many software applications are produced by programmers that have not been properly trained in best security practices. And fourth, a software application is often created by composition with other software components whose provenance and adherence to security best practices can be of dubious quality. In short, not only are command injection attacks severe, they are here to stay for the foreseeable future.

OVERVIEW

An aspect of an embodiment of the present invention provides, among other things, a method, system, and computer readable medium for protecting software against a class of attacks known as "command injection attacks" that exploit common vulnerabilities found in software. The #1 and #2 listed items on MITRE's 2011 list of the "Top 25 Most Dangerous Software Errors" (https://cwe.mitre.org/top25/index.html) and the #1 and #2 listed flaws on the Open Web Application Security Project "Top 10 Application Security Risks" (https://www.owasp.org/index.php/Top_10_2010-Main) enable attackers to craft command injection attacks. Similarly, the #4 listed item on MITRE's list-"Improper Neutralization of Input During Web Page Generation ('Cross-site Scripting')"—enables attacker to craft command injection attacks. Still yet, the #23 listed item on MITRE's list-"Uncontrolled Format String"—enables attacker to craft command injection attacks.

These attacks are dangerous because they will frequently allow attackers to completely take over the software, steal data, or prevent the software from working at all.

Accordingly, an aspect of an invention of the present invention provides an efficient solution for thwarting command injection attacks and for allowing software to continue operating despite attempts at subverting software.

An aspect of the present invention provides for, but not limited thereto, an approach for preventing or mitigating command injection attacks; and accordingly it recognizes that various attacks inject a payload that then gets processed by the software to carry out the attackers' intentions. The problem is that software vulnerabilities allow the malicious attacker payload to be processed normally as if it were a non-malicious payload.

The attack payload can be viewed as foreign genetic material that will typically not be present in the native software. Thus, one approach of stopping command injection attacks is to track all external data processed by software, e.g., network input, data entered in a web form, files uploaded to a server, and monitor its use in security-critical commands. If such data is detected, the software can refuse to carry out the command. Such an approach is referred to as taint propagation. The present inventors recognize that while such an approach may be effective in terms of stopping command injection attacks, this approach is not practical as tracking the flow of data through a software program is expensive and severely impacts performance.

Instead of keeping track of external (potentially malicious) data, an aspect of an embodiment of the present invention provides a method, system, and computer readable medium to identify native genetic material, such as but not limited thereto, command fragments. An aspect of an embodiment of the present invention scans software for fragments that can be used to form commands issued by the software. Whenever the software issues a command, the method or system of the present invention can intercept the command and uses a matching algorithm or method to reassemble the command using the identified fragments. The method or system of the present invention detects an attempted attack by looking for critical parts of the command that do not originate from the previously identified fragments. Once an attack is detected, the method or system of the present invention performs an analysis to determine the type of attacks, and then is able to remediate the attack to allow the software to continue normal operation.

By identifying native genetic material used to form a command (instead of attempting to track foreign material), an aspect of an embodiment of the present invention provides an approach that dispenses with expensive taint propagation techniques.

Furthermore, an aspect of an embodiment of the present invention provides an approach that is transparent and can be automatically applied to software already installed on a computing system, without necessarily involving the original software manufacturer, and without requiring modifications to the software program to be protected.

Accordingly, an aspect of various embodiments of the present invention is that it would have wide applicability. In particular, an aspect of an embodiment of the present invention can be used to secure any software that is network-enabled. An aspect of an embodiment of the present invention protects software against a severe class of attacks known as command injection attacks. Examples of such attacks include Structured Query Language (SQL) Injection Attacks (e.g., database attack), operating system (OS) Command Injection Attacks, Cross-Site Scripting Attacks, LDAP Injection Attacks, XML Injection Attacks, Cross-Site Scripting (XSS) Attacks, and format string attacks. Command injection attacks exploit the #1, #2, #4 and #23 software errors as described in MITRE's list of Top 25 Most Dangerous Software Errors. Further, an aspect of an embodiment of the present invention also allows many software programs to continue normal operation even after an attempted attack.

An aspect of an embodiment of the present invention protects software even after the software manufacturer has shipped it. An aspect of an embodiment of the present invention does not require users to modify the program. An aspect of an embodiment of the present invention can even be applied directly to programs shipped in binary form. Furthermore, modern software makes frequent use of third-party components whose quality may be unknown or untrusted. Accordingly, an aspect of an embodiment of the present invention allows such software to be built with security protection despite these third party components.

The novel aspects of the present invention provides, but not limited thereto, a process and algorithms (and related system and computer readable medium) for determining fragments, reassembling fragments to match commands to determine whether a command is safe or suspicious, such as a potential attack, and allowing software to continue execution despite potential attacks or actual attacks. This may all be done transparently, efficiently, without requiring any efforts from software developers.

An aspect of various embodiments of the present invention may provide a number of advantages, such as but not limited thereto, the ability to protect software without requiring users to modify the software, which therefore makes it a practical solution.

An aspect of an embodiment of the present invention thwarts a severe and important class of attacks, namely command injection attacks. These attacks exploit software vulnerabilities that are in the MITRE's list of the "Top 25 Most Dangerous Software Errors". An aspect of an embodiment of the present invention also allows many software programs to continue normal operation even after an attempted attack.

An aspect of various embodiments of the present invention may be utilized for a number of products and services, such as but not limited thereto, as discussed below. An aspect of an embodiment of the present invention is applicable to all software. It can be applied on a wide variety of platforms and applications, including laptops, desktops, cell phones, tablets, photo frames, cameras, video recorders, PDAs, routers, web browsers and servers, music players, televisions, game consoles, handheld gaming devices, critical infrastructure devices (traffic lights, power relays), heart-rate monitors, biometric monitors, networked-enabled sensors, etc. The importance of the invention will only rise over time as more and more devices are becoming network-enabled, e.g. refrigerator, home thermostats, automobiles, medical devices, etc. Further, an aspect of an embodiment can be applied on a wide variety of applications for infrastructure related systems and devices, such as power utilities, water utilities, public utilities, office infrastructure, home dwellings, department of defense infrastructure and systems, military equipment and systems, medical equipment and systems, vehicles, aircraft, server farms, and watercraft.

An aspect of an embodiment of the present invention provides a method, system and computer readable medium that can thwart OS command injection attacks (as well as data base or SQL injection attacks, database and web based application; format string attacks; LDAP injection attacks, XPATH injection attacks, cross-site scripting (XSS) attacks, attacks against scripting languages, and NoSQL injection attacks or the like) by matching the program's signature fragments to the commands it attempts to issue. If commands cannot be matched, the software, system and method of an embodiment of the present invention assumes that the command that has been injected into the program is potentially dangerous.

An aspect of an embodiment of the present invention provides, among other things, a method, system and computer readable medium that provides, among other things, taint inference and positive tainting resulting in positive taint inference An aspect of an embodiment of the present invention is that it does not require the software manufacturer to change their code. In fact, as discussed above, an aspect of an embodiment of the invention can be applied even after the manufacturer has shipped the software.

An aspect of an embodiment of the present invention provides, but not limited thereto, a computer method for detecting command injection attacks. The method may comprise: receiving software code; extracting string fragments from the received software code to provide extracted signature fragments; receiving command instructions; converting the received command instructions into command fragments; identifying critical parts from the commands fragments; determining if the critical parts are untrusted or trusted by matching with the extracted signature fragments; identifying potential attacks upon the condition that a command includes critical parts that are untrusted; and communicating the identification of potential attacks to an output device.

An aspect of an embodiment of the present invention provides, but not limited thereto, a computer method for detecting command injection attacks. The method may comprise: receiving software code; receiving string fragments to provide signature fragments; receiving command instructions; converting the received command instructions into command fragments; identifying critical parts from the commands fragments; determining untrusted or trusted parts of the command instructions by using the signature fragments; identifying potential attacks upon the condition that a command includes critical parts that are untrusted; and communicating the identification of potential attacks to an output device.

An aspect of an embodiment of the present invention provides, but not limited thereto, a system for detecting command injection attacks based on command instructions to be received from a client processor or client data memory (or other processor or data memory as desired, needed or required). The system may comprise: a memory unit operative to store software code; and a processor. The processor may be configured to: extract string fragments from the software code to provide extracted signature fragments; receive the client command instructions; convert the received command instructions into command fragments; identify critical parts from the commands fragments; determine if the critical parts are untrusted or trusted by matching with the extracted signature fragments; identify potential attacks upon the condition that a command includes critical parts that are untrusted; and communicate the identification of potential attacks to an output device.

An aspect of an embodiment of the present invention provides, but not limited thereto, a system for detecting command injection attacks based on command instructions to be received from a client processor or client data memory (or other processor or data memory as desired, needed or required). The system may comprise: a memory unit operative to store software code and a processor. The processor may be configured: receive string fragments to provide signature fragments; receive command instructions; convert the received command instructions into command fragments; identify critical parts from the commands fragments; determine untrusted or trusted parts of the command instructions by using the signature fragments; identify potential attacks upon the condition that a command includes critical parts that are untrusted; and communicate the identification of potential attacks to an output device.

An aspect of an embodiment of the present invention provides, but not limited thereto, a non-transitory computer readable medium including instructions executable by a processor for detecting command injection attacks. The instructions may comprise: receiving software code; extracting string fragments from the received software code to provide extracted signature fragments; receiving command instructions; converting the received command instructions into command fragments; identifying critical parts from the commands fragments; determining if the critical parts are untrusted or trusted by matching with the extracted signature fragments; identifying potential attacks upon the condition that a command includes critical parts that are untrusted; and communicating the identification of potential attacks to an output device.

An aspect of an embodiment of the present invention provides, but not limited thereto, a non-transitory computer readable medium including instructions executable by a processor for detecting command injection attacks. The instructions may comprise: receiving software code; receiving string fragments to provide signature fragments; receiving command instructions; converting the received command instructions into command fragments; identifying critical parts from the commands fragments; determining untrusted or trusted parts of the command instructions by using the signature fragments; identifying potential attacks upon the condition that a command includes critical parts that are untrusted; and communicating the identification of potential attacks to an output device.

An aspect of an embodiment of the present invention provides, but not limited thereto, methods and systems that are described herein for detecting command injection attacks. A positive, taint inference method includes receiving signature fragments on one hand, converting command injection instructions into command fragments on another hand, thus identifying potential attacks upon the condition that a command injection instruction includes critical untrusted parts by using signature fragments. A system detects command injection attacks using this kind of method, and remediates and rejects potential attacks.

These and other objects, along with advantages and features of various aspects of embodiments of the invention disclosed herein, will be made more apparent from the description, drawings and claims that follow.

BRIEF DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIG. 3A provides an illustration of a command with associated trusted and critical markings when the program is passed a benign input.

FIG. 3B provides an illustration of a command with associated trusted and critical markings when the program is passed a malicious input.

FIG. 4 shows a representative sampling of the Signature fragments from the Spam Assassin program.

FIG. 5 provides an illustration of the imposed constraints that command names, shell metacharacters used for starting subcommands and their associated command names, option flags, and environment variable names that must come from a single signature fragment.

FIG. 6 provides an illustration on how these policies provide overlapping means to detect attacks.

FIG. 15 provides a table representing the performance overhead in milliseconds, wherein the asterisks indicate the differences are not statistically significant for the 50 trial runs performed.

FIG. 16 provides a table representing the analysis time in seconds.

DETAILED DESCRIPTION OF EXEMPLARY EMBODIMENTS OF THE INVENTION

Figure 9A:
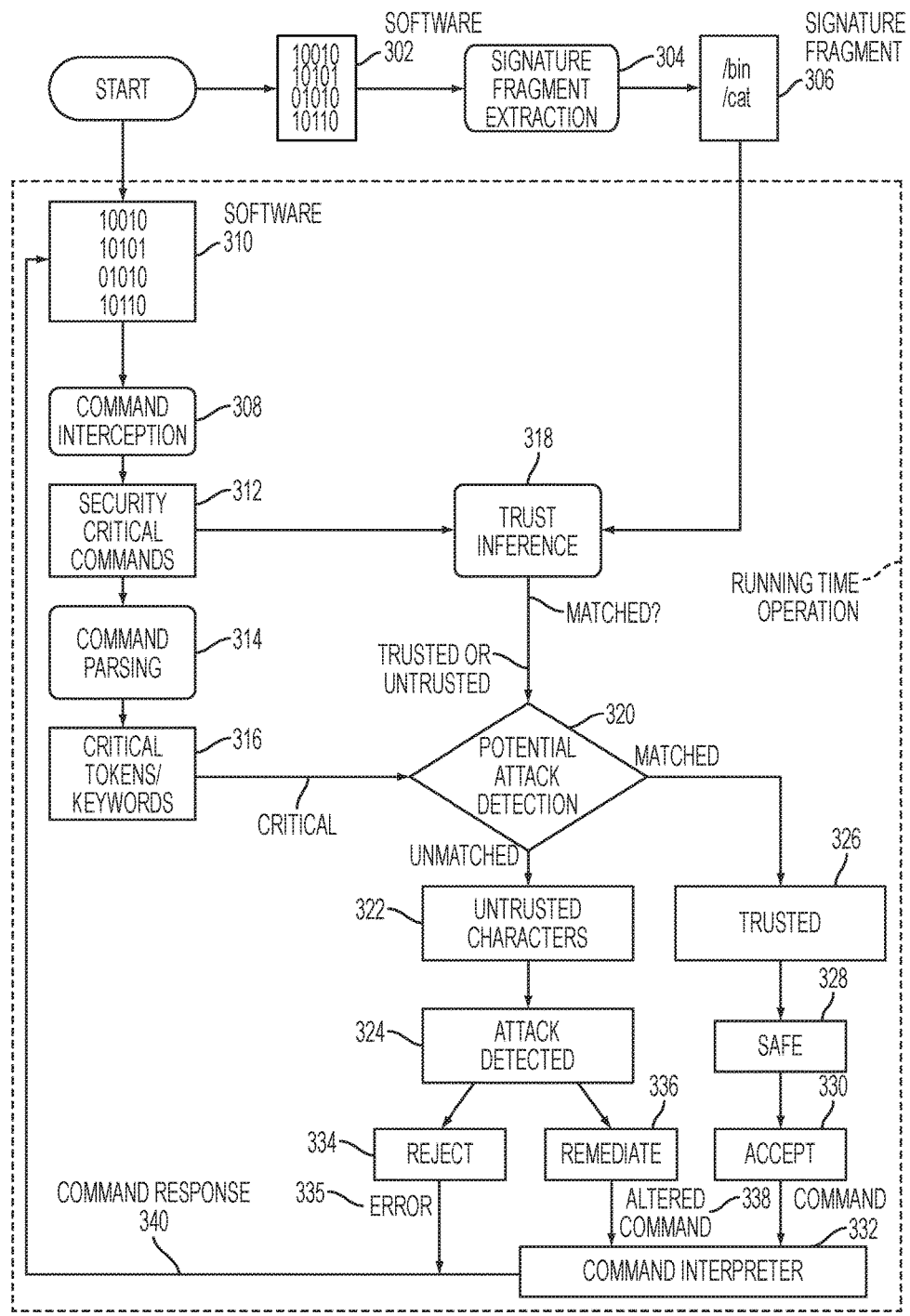
FIG. 9A provides a schematic of an architecture representing an embodiment of the computer related method and system for detecting, mitigating and/or preventing command injection attacks.

FIG. 9A provides a schematic of an architecture representing an embodiment of the computer related method and system for detecting, mitigating and/or preventing command injection attacks. A binary software code 302 is provided, for example. A signature fragment extraction module 304 is provided to extract string fragments from the provided binary software code 302 (as well as possibly its associated libraries or the like) to obtain signature fragments 306. For example, a signature fragment may be "/bin" or "/cat" as illustrated. This extraction may be done once, prior to program execution, offline, and therefore the analysis time is not necessarily counted against the run-time overhead. As will be discussed later, an approach for extracting signature fragments includes the following two steps 1) string extraction approach and 2) post-processing of signature fragments. An alternative approach for receiving string fragments involves downloading fragments from the software developers' web site or having the software ship with fragments. Yet another approach involves manually specifying string fragments. Still another approach involves using dynamic analysis such as profiling the software code to obtain string fragments. Some Examples of post-processing may include one or more of the following: removing the extracted signature fragments; adding the extracted signature fragments; modifying the extracted signature fragments; or annotating the extracted signature fragments with additional information. Again, it should be appreciated that an extraction step is not necessarily required in an embodiment. For example, a software manufacture could provide the signatures and therefore there would be no need to extract them.

Still referring to FIG. 9A, a command interception module 308 is provided for intercepting the security-critical commands from the running software 310 (for example, command injections or executing software) so as to extract security critical commands 312 there from). As will be discussed herein, the running software 310 (for example, command injections) may be executed offline instead of online—or a combination thereof. This particular embodiment, for example, may be directed toward OS type command instructions. However, it should be appreciated that the present invention may be applicable to database command instructions or structured query language (SQL) language instructions, instructions to (or for) a web based language; instructions for a format string interpreter; instructions to (or for) a LDAP interpreter, instructions to (or for) a XPATH interpreter, instructions to (or for) a scripting language, and instructions to a NoSQL database, or other types of instruction command or languages. Regarding OS type commands, for example, it should be appreciated that some primary candidates for the family of functions for security-critical commands may include the following families of function: system, popen, rcmd and exec. It should be appreciated that other types of functions or families of functions could be intercepted as well. Also, a type of attack may be a cross-site scripting (XSS) attack.

Additionally, a command parsing module 314 is provided for identifying the security-critical parts of a command 316. Some examples of critical parts of a command 316 may include, for example, critical tokens and keywords. Accordingly, this shall parse the intercepted security-critical commands 312 to identify the security-critical parts of a command 316, such as critical tokens and keywords. For OS commands, the security critical parts 316 may consist of command names, options, delimiters, special characters and the setting of environment variables. This command parsing module 314 is responsible for identifying the security-critical parts of a command. For example, for OS commands may include implementing a simple, combined lexical analyzer and parser.

Additionally, a trust inference module 318 is provided for determining the parts of the command that are untrusted or trusted. In an approach, the trust inference module 318 makes this determination by matching or comparing the intercepted commands 312 against the extracted signature fragments 306. If a match is found then that part of the command of the signature fragment is considered trusted according to the trust inference module 318. Conceptually, the trust inference component 318 infers which portions of the command come from within the program, and which ones come from external sources (i.e., potentially malicious). In another embodiment, the trust inference component may use different policies for establishing trust. Examples include requiring that critical parts of a command come from one signature, or from a set of related signatures, or using any available annotations.

Accordingly, still referring to FIG. 9A, an attack detection module 320 is provided for 1) scanning the command for any character that has been marked as untrusted by the trust inference component 318 and 2) scanning the critical tokens and keywords 316 generated by the command parsing component 314. If parts of the command are both untrusted and critical then untrusted critical characters 322 are thereby identified and therefore a potential attack is detected 324. Whereas, if no parts of the critical command 312 are both untrusted and critical then it is determined that the whole command 312 is deemed trusted and blessed 326 and therefore deemed safe 328. If deemed safe 328 then the command may be accepted 330 and transmitted to a command interpreter 332 (e.g., a server, such as a backend server). Again, the command interpreter 332 may be one or more of the following: OS command interpreter, a data base or SQL interpreter, web scripting language interpreter; format string interpreters; LDAP interpreter, XPATH interpreter, and a scripting language interpreter. In addition, a command interpreter may be distributed (e.g., across multiple devices).

For instance, where a potential attack is detected 324, then the command may be rejected 334 with an error message 335 or remediated 336 for instances where remediation is deemed appropriate. The remediation may include altering the command 338 so as to deem it acceptable and therefore acceptable for transmission to the command interpreter 332 (e.g., a server, such as a backend server).

A command response 340 is transmitted from the command interpreter 332 (for example, operating system) to the runtime software 310.

Figure 9B:
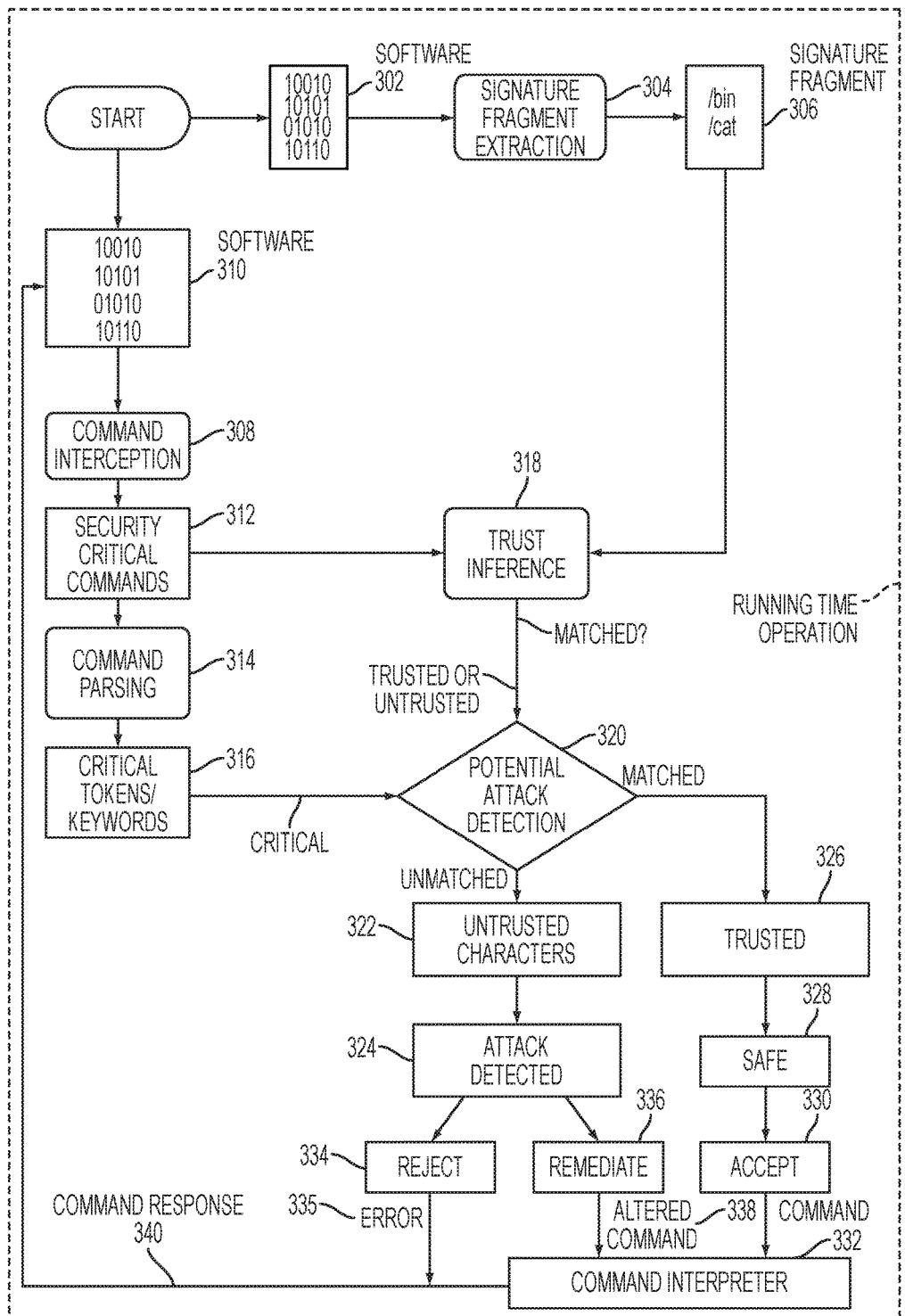
FIG. 9B is similar to the architecture represented in FIG. 9A except for the fact that the binary software code 302, signature fragment extraction module 304 and signature fragments 306 are provided or executed as part of the running time operation.

FIG. 9B provides a schematic of an architecture representing an embodiment of the computer related method and system for detecting, mitigating and/or preventing command injection attacks. FIG. 9B is similar to FIG. 9A except for the fact that the binary software code 302, signature fragment extraction module 304 and signature fragments 306 are provided or executed as part of the running time operation.

Figure 9C:
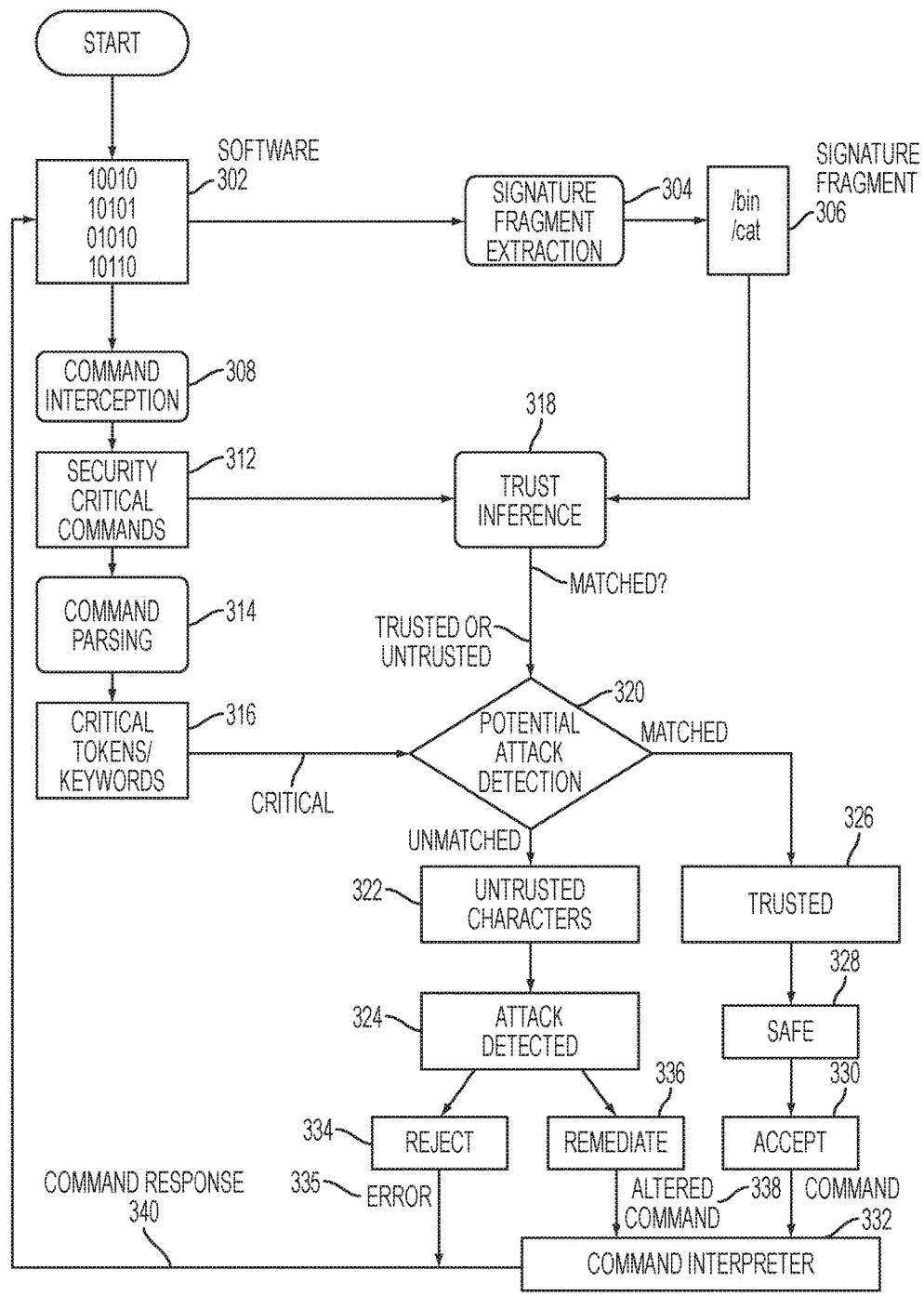
FIG. 9C is similar to the architecture represented in FIG. 9A except for the fact that all of the modules as depicted are not provided or executed as part of the running time operation.

FIG. 9C provides a schematic of an architecture representing an embodiment of the computer related method and system for detecting, mitigating and/or preventing command injection attacks. FIG. 9C is similar to FIG. 9A except for the fact that all of the modules as depicted are not provided or executed as part of the running time operation.

Figure 10:
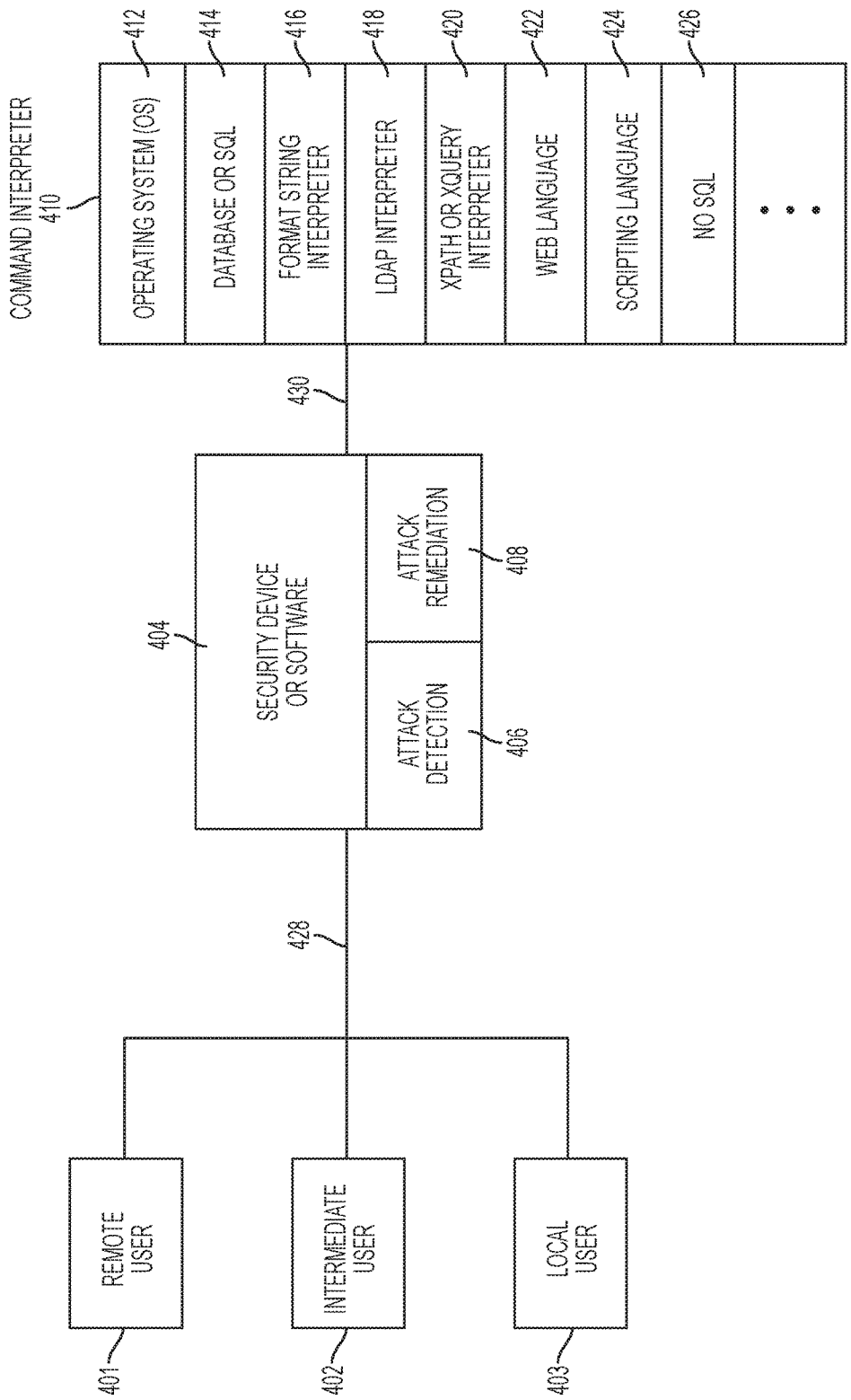
FIG. 10 provides a schematic of a high-level overview of an embodiment of the present invention method and system for detecting, mitigating and/or preventing command injection attacks.

FIG. 10 provides a schematic of a high-level overview of an embodiment of the present invention method and system for detecting, mitigating and/or preventing command injection attacks. For example, the system (and related method) may include an end-user, that may include, for example, a remote user 401, an intermediate user 402 or a local user 403, which sends in command injections through wired structure, wireless communication, network, integrated circuit, or any other communication methods and devices 428. A command interpreter 410 may be provided, which executes the command injections through different kinds of a device, server, system or integrated circuit, such as an operating system (OS) 412, database or SQL 414, format string interpreter 416, LDAP interpreter 418, XPATH or XQUERY interpreter 420, web language 422, scripting language 424, NoSQL 426 or the like. A security device 404 may be provided which safeguards the command interpreter 410. The security device 404 may be in communication with the command interpreter 410 through hard wired structure, wireless communication, network, integrated circuit, or any other communication methods and devices 430. The security device 404 may include various components and functions, including the steps or modules for providing attack detection 406 and attack remediation 408.

Still referring to FIG. 10, in an embodiment the end user, such as a remote user 401 or intermediate users 402 may be on the client side while the command interpreter 410 may be on the server side. However, it should be appreciated that the client side may be at a distance from the server side such as being: in different locations within a building, in different buildings or vehicles, or in various geographical locations. The geographical locations may include different locations within a state or out of state, as well being in different countries or continents. The communications may entail satellite or aerospace communications, for example.

Still referring to FIG. 10, in an embodiment the end user, such as a local user 403 or the like may be on the client side while the command interpreter 410 may be on the server side. However, it should be appreciated that both the client side and server side may be integrally located within a single device such as a smart phone, laptop, computer notebook, iPad, PDA, PC or other processor based machines (or machine executable system or device). Moreover, it should be appreciated that rather than being located within single device (e.g., smart phone, laptop, computer notebook, iPad, PDA, PC, desktop, tablet, camera, gaming device, or television or the like) the client side and server side components or modules may be present in multiple devices. Still yet, it should be appreciated that indifferent of being contained within a single device or present in multiple devices, the subject approach may be applied to multiple devices that are networked together either wirelessly or hardwired or both so as to communicate amongst the various devices or some other remote site or system; as well as a combination of communicating amongst the devices as well as with a remote site(s), system(s) or network(s).

Next, referring to FIGS. 9 (9A, 9B & 9C) and FIG. 10 together, it should be appreciated that an embodiment of the present invention system and method may provide an end-user, that may include, for example, a remote user 401, an intermediate user 402, and/or local user 403 that sends in command injection instructions through the software 310. In an embodiment, the security device 404 may include various components or related steps as illustrated in FIGS. 9A, 9B, and 9C. In some instances, the security device 404 may include everything in FIG. 9 other than the software 302, 310 and command Interpreter 332. The security device 404 detects, monitors, and remediates potential injection attacks received from the software 302, 310 before transmitting accepted/remediated commands to Command Interpreter 332, 410. The remote user 401, intermediate user 402, and local user 403 may be configured to interact or communicate with one another such as through one or more devices, systems, or networks. Alternatively, remote user 401, intermediate user 402, and local user 403 may be configured to be independent of one another.

Still referring to FIGS. 9 (9A, 9B & 9C) and FIG. 10, operationally, for example but limited thereto, the software 302, 310 may be between a user (for example, a remote user 401, an intermediate user 402 or a local user 403) and the security device 404. It should be appreciated that physically speaking, the software component 302, 310 may be located at the same location as the command interpreter 332. Moreover, it should be appreciated that in other embodiments the software component 302, 310 may be located at or inside any of the related components reflected in the illustration of FIG. 10—as well as other locations and devices and systems not shown. For instance, in an embodiment for certain operations, an end user tries to communicate with the command interpreter through software. An aspect of embodiment of the present invention (security device) comes in-between to protect the command interpreter from potential attacks.

Figure 11A:
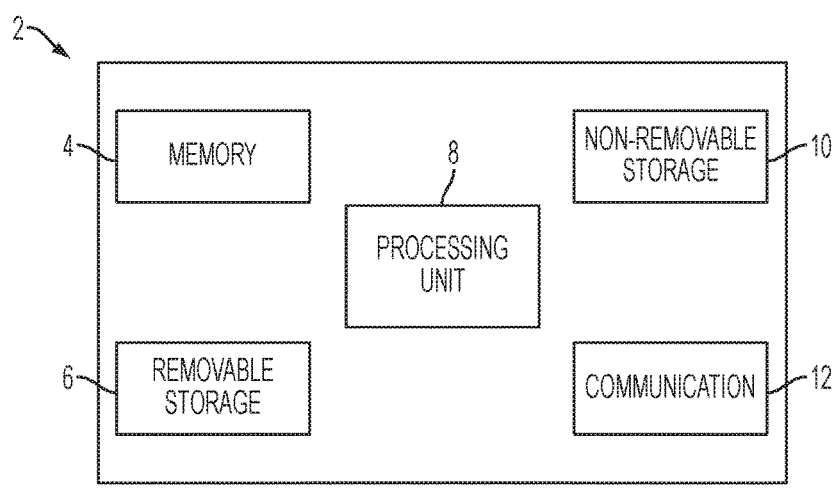
FIG. 11A schematically depicts a computing device in which an embodiment of the invention may be implemented. In its most basic configuration, the computing device may include at least one processing unit and memory. Memory may be volatile, non-volatile, or some combination of the two. Additionally, the device may also have other features and/or functionality. For example, the device may also include additional removable and/or non-removable storage including, but not limited to, magnetic or optical disks or tape, as well as writable electrical storage media.

Various embodiments or aspects of the invention may be implemented as software in a computing device, or alternatively, on hardware. For example, FIG. 11A schematically depicts a computing device 2 in which an embodiment of the invention may be implemented. In its most basic configuration, the computing device may include at least one processing unit 8 and memory 4. Memory 4 can be volatile, non-volatile, or some combination of the two. Additionally, the device 2 may also have other features and/or functionality. For example, the device may also include additional removable storage 6 and/or non-removable storage 10 including, but not limited to, magnetic or optical disks or tape, as well as writable electrical storage media. The device 2 may also include one or more communication connections 12 that may allow the device to communicate with other devices (e.g., other computing devices). The communication connections 12 may carry information in a communications media. Communications media may embody computer-readable instructions, data structures, program modules, or other data in a modulated data signal such as a carrier wave or other transport mechanism and may include any information delivery media. Computer-readable media may include both storage and communication media. A modulated data signal may include a signal that has one or more of its characteristics set or changes in such a manner as to encode, execute, or process information in the signal. For example, a communication medium may include wired media such as radio, RF, infrared, and other wireless devices.

In addition to implementation on a standalone computing machine, embodiments of the invention may also be implemented on a network system comprising a plurality of computing devices that are in communication with a networking means, such as a network with an infrastructure or an ad hoc network. The network connection may be wired, wireless, or a combination thereof.

Figure 11B:
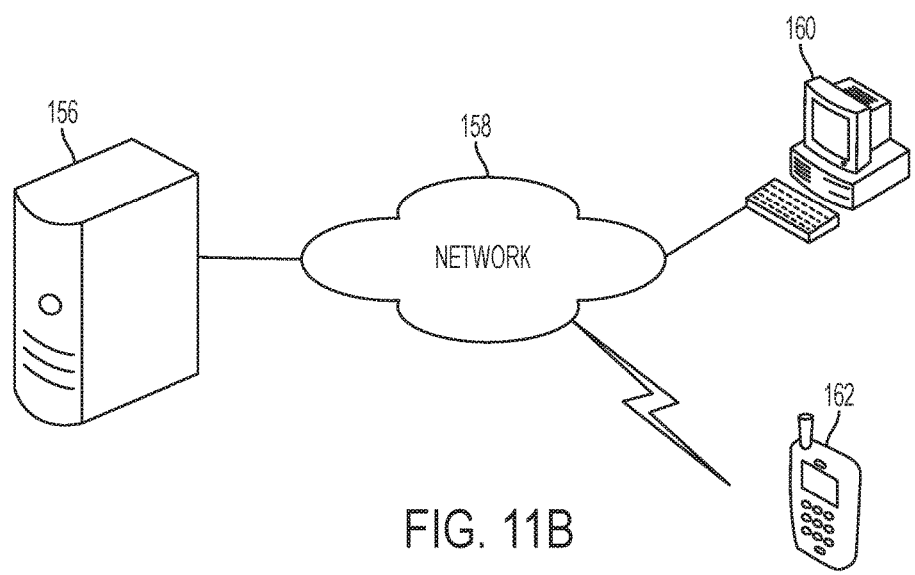
FIG. 11B schematically depicts a network system with an infrastructure or an ad hoc network in which embodiments of the invention may be implemented. In this example, the network system comprises a computer, network connection means, computer terminal, and PDA (e.g., a smartphone) or other handheld device.

As a way of example, FIG. 11B illustrates a network system in which embodiments of the invention may be implemented. In this example, the network system comprises a computer 156 (e.g., a network server), network connection means or structure 158 (e.g., wired and/or wireless connections), computer terminal 160, and PDA (e.g., a smart-phone) 162 (or other handheld or portable device, such as a cell phone, laptop computer, tablet computer, GPS receiver, mp3 player, handheld video player, pocket projector, etc. or handheld devices (or nonportable devices) with combinations of such features). The embodiments of the invention may be implemented in anyone of the devices of the system. For example, execution of the instructions or other desired processing maybe performed on the same computing device that is anyone of 156, 160, and 162. Alternatively, an embodiment of the invention maybe performed on different computing devices of the network system. For example, certain desired or required processing or execution may be performed on one of the computing devices of the network (e.g., server 156), whereas other processing and execution of the instruction may be performed at another computing device (e.g., terminal 160) of the network system, or vice versa. In fact, certain processing or execution may be performed at one computing device (e.g., server 156); and the other processing or execution of the instructions may be performed at different computing devices that may or may not be networked. For example, the certain processing may be performed at the terminal 160, while the other processing or instructions may be passed to a device 162 where the instructions are executed. This scenario may be of particular value especially when the PDA device, for example, accesses to the network through computer terminal 160 (or an access point in an ad hoc network). For another example, software to be protected may be executed, encoded or processed with one or more embodiments of the invention. The processed, encoded or executed software can then be distributed to customers. The distribution can be in a form of storage media (e.g. disk) or electronic copy.

Figure 12:
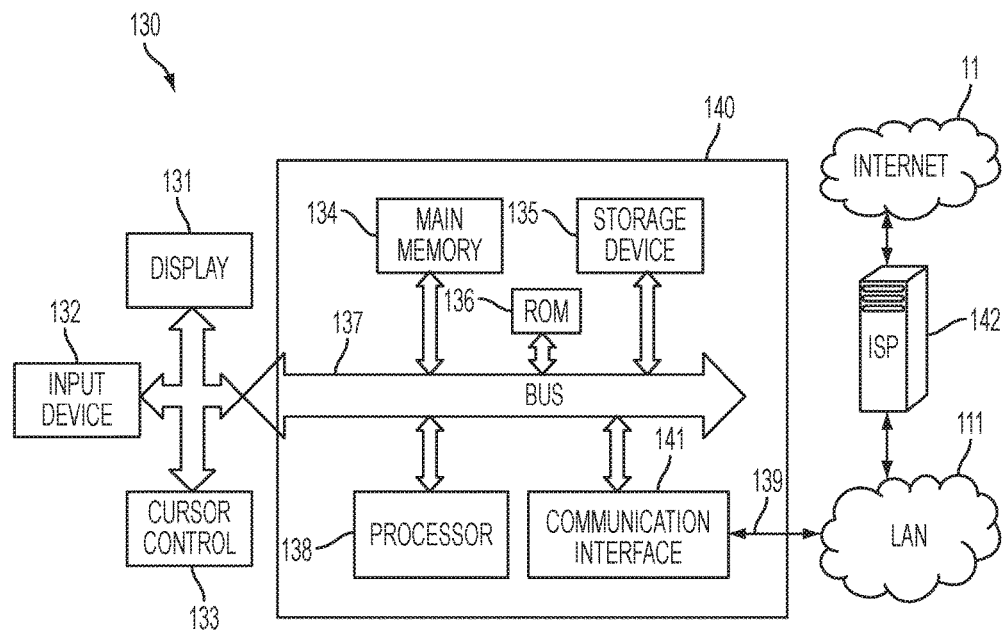
FIG. 12 schematically depicts a block diagram for a system or related method of an embodiment of the present invention in whole or in part.

FIG. 12 is a block diagram that illustrates a system 130 including a computer system 140 and the associated Internet 11 connection upon which an embodiment may be implemented. Such configuration is typically used for computers (hosts) connected to the Internet 11 and executing a server or a client (or a combination) software. A source computer such as laptop, an ultimate destination computer and relay servers, for example, as well as any computer or processor described herein, may use the computer system configuration and the Internet connection shown in FIG. 12. The system 140 may be used as a portable electronic device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 12 illustrates various components of a computer system, it is not intended to represent any particular architecture or manner of interconnecting the components; as such details are not germane to the present invention. It will also be appreciated that network computers, handheld computers, cell phones and other data processing systems that have fewer components or perhaps more components may also be used. The computer system of FIG. 12 may, for example, be an Apple Macintosh computer or Power Book, or an IBM compatible PC. Computer system 140 may include a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138.

Main memory 134 also may be used for storing temporary variables or other intermediate information during execution of instructions to be executed by processor 138. Computer system 140 further includes a Read Only Memory (ROM) 136 (or other non-volatile memory), or other static storage device coupled to a bus 137 for storing static information and instructions for processor 138. A storage device 135 may be coupled to the bus 137 for storing information and instructions. The storage device 135 may include a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Computer system 140 may be coupled via bus 137 to a display 131, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 132, including alphanumeric and other keys, may be coupled to bus 137 for communicating information and command selections to processor 138. Another type of user input device is cursor control 133, such as a mouse, a trackball, or cursor direction keys for communicating direction information and command selections to processor 138 and for controlling cursor movement on display 131. This input device typically has two degrees of freedom in two axes, a first axis (e.g., x) and a second axis (e.g., y), that allows the device to specify positions in a plane.

The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135. Execution of the sequences of instructions contained in main memory 134 causes processor 138 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") as used herein is an extensible term that refers to any medium or any memory, that participates in providing instructions to a processor, (such as processor 138) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise bus 137. Transmission media can also take the form of acoustic or light waves, such as those generated during radio wave and infrared data communications, or other form of propagated signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 138 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infra-red transmitter to convert the data to an infra-red signal. An infra-red detector may receive the data carried in the infra-red signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138.

Computer system 140 also may include a communication interface 141 coupled to bus 137. Communication interface 141 provides a two-way data communication coupling to a network link 139 that is connected to a local network 111. For example, communication interface 141 may be an Integrated Services Digital Network (ISDN) card or a modem to provide a data communication connection to a corresponding type of telephone line. As another non-limiting example, communication interface 141 may be a local area network (LAN) card to provide a data communication connection to a compatible LAN. For example, Ethernet based connection based on IEEE 802.3 standard may be used such as 10/100BaseT, 1000BaseT (gigabit Ethernet), 10 gigabit Ethernet (10 GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba), as described in Cisco Systems, Inc. Publication number 1-587005-001-3 (6/99), "Internetworking Technologies Handbook", Chapter 7: "Ethernet Technologies", pages 7-1 to 7-38, which is incorporated in its entirety for all purposes as if fully set forth herein. In such a case, the communication interface 141 typically include a LAN transceiver or a modem, such as Standard Microsystems Corporation (SMSC) LAN91C111 10/100 Ethernet transceiver described in the Standard Microsystems Corporation (SMSC) data-sheet "LAN91C111 10/100 Non-PCI Ethernet Single Chip MAC+PHY" Data-Sheet, Rev. 15 (02-20-04), which is incorporated in its entirety for all purposes as if fully set forth herein.

Wireless links may also be implemented. In any such implementation, communication interface 141 sends and receives electrical, electromagnetic or optical signals that carry digital data streams representing various types of information.

Network link 139 typically provides data communication through one or more networks to other data devices. For example, network link 139 may provide a connection through local network 111 to a host computer or to data equipment operated by an Internet Service Provider (ISP) 142. ISP 142 in turn provides data communication services through the world wide packet data communication network Internet 11. Local network 111 and Internet 11 both use electrical, electromagnetic or optical signals that carry digital data streams. The signals through the various networks and the signals on the network link 139 and through the communication interface 141, which carry the digital data to and from computer system 140, are exemplary forms of carrier waves transporting the information.

The processor 138 may execute received code as it is received, and/or stored in storage device 135, or other non-volatile storage for later execution. In this manner, computer system 140 may obtain application code in the form of a carrier wave.

The concept of instruction location randomization may be implemented and utilized with the related processors, networks, computer systems, internet, modules, and components and functions according to the schemes disclosed herein.

Figure 13:
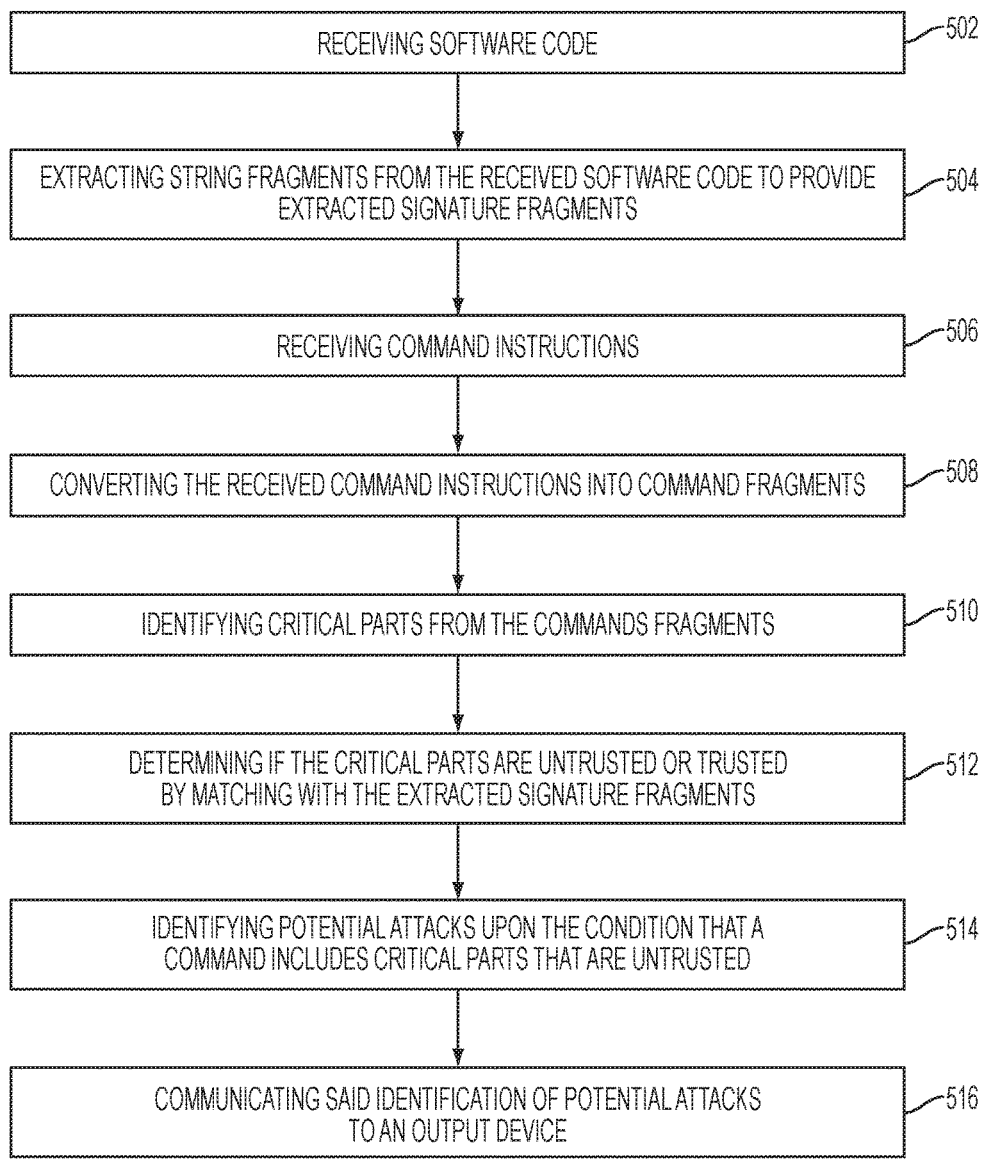
FIG. 13 provides a flow chart depicting an aspect of an embodiment of the present invention computer related method and corresponding system or device.

Referring to FIG. 13, FIG. 13 provides a flow chart depicting an aspect of an embodiment of the present invention computer related method that may include the following steps: receiving software code 502; extracting string fragments from said received software code to provide extracted signature fragments 504; receiving command instructions 506; converting the received command instructions into command fragments 508; identifying critical parts from said commands fragments 510; determining if said critical parts are untrusted or trusted by matching with said extracted signature fragments 512; identifying potential attacks upon the condition that a command includes critical parts that are untrusted 514; and communicating said identification of potential attacks to an output device 516. It should be appreciated that an embodiment may entail a system that comprises an assembly of hardware component modules (or firmware) configured to perform the functions of the enumerated steps.

Figure 14:
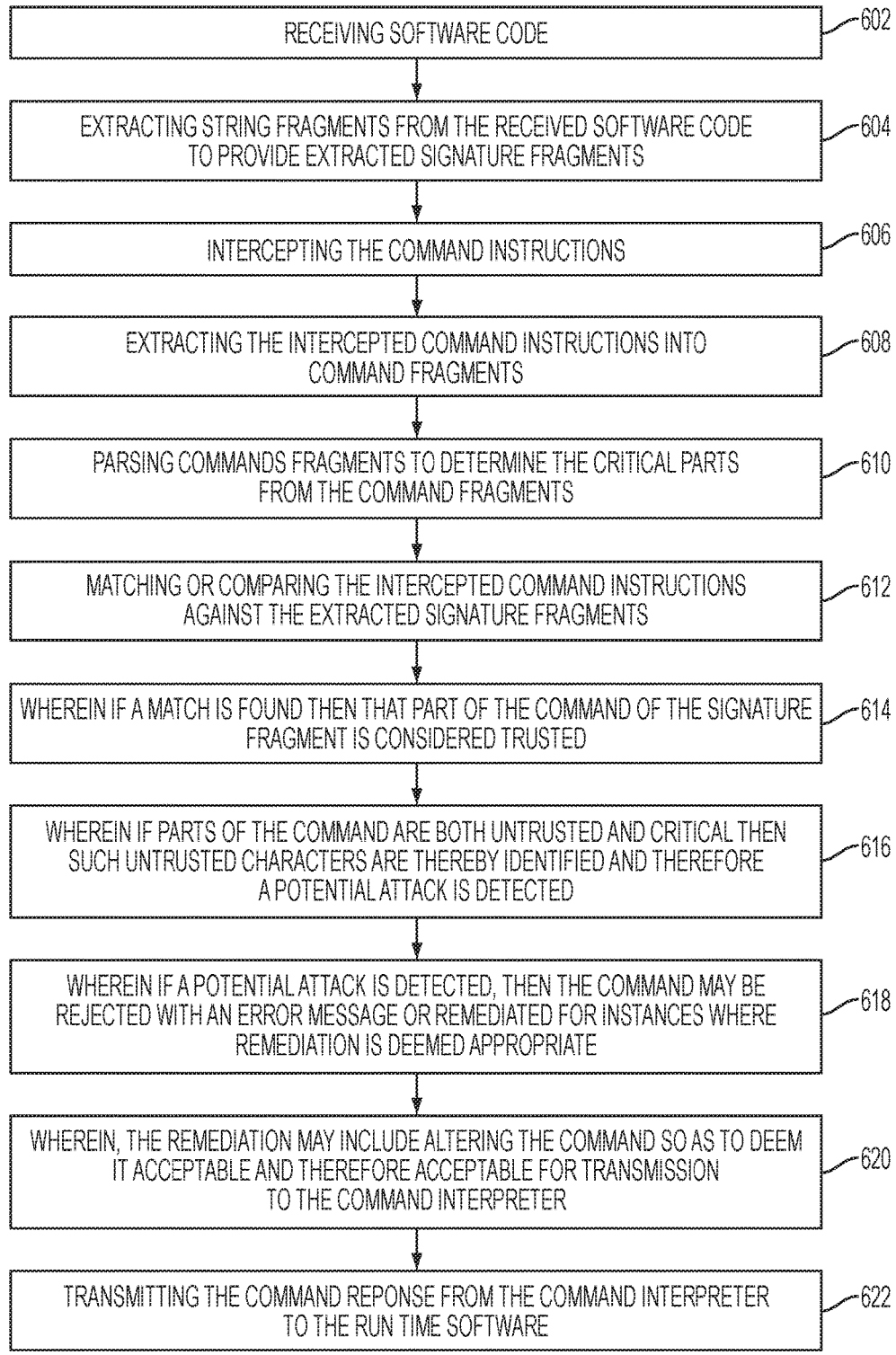
FIG. 14 provides a flow chart depicting an aspect of an embodiment of the present invention computer related method and corresponding system or device.

Referring to FIG. 14, FIG. 14 provides a flow chart depicting an aspect of an embodiment of the present invention computer related method that may include the following steps: receiving software code 602; extracting string fragments from said received software code to provide extracted signature fragments 604; intercepting the command instructions 606; extracting the intercepted command instructions into command fragments 608; parsing commands fragments to determine the critical parts from said command fragments 610; matching or comparing the intercepted command instructions against the extracted signature fragments 612; wherein if a match is found then that part of the command of the signature fragment is considered trusted 614; wherein if parts of the command are both untrusted and critical then such untrusted characters are thereby identified and therefore a potential attack is detected 616; wherein if a potential attack is detected, then the command may be rejected with an error message or remediated for instances where remediation is deemed appropriate 618; wherein, the remediation may include altering the command so as to deem it acceptable and therefore acceptable for transmission to the command interpreter 620; and transmitting the command response from the command interpreter to the run time software 622. It should be appreciated that an embodiment may entail a system that comprises an assembly of hardware component modules (or firmware) configured to perform the functions of the enumerated steps.

Figure 17:
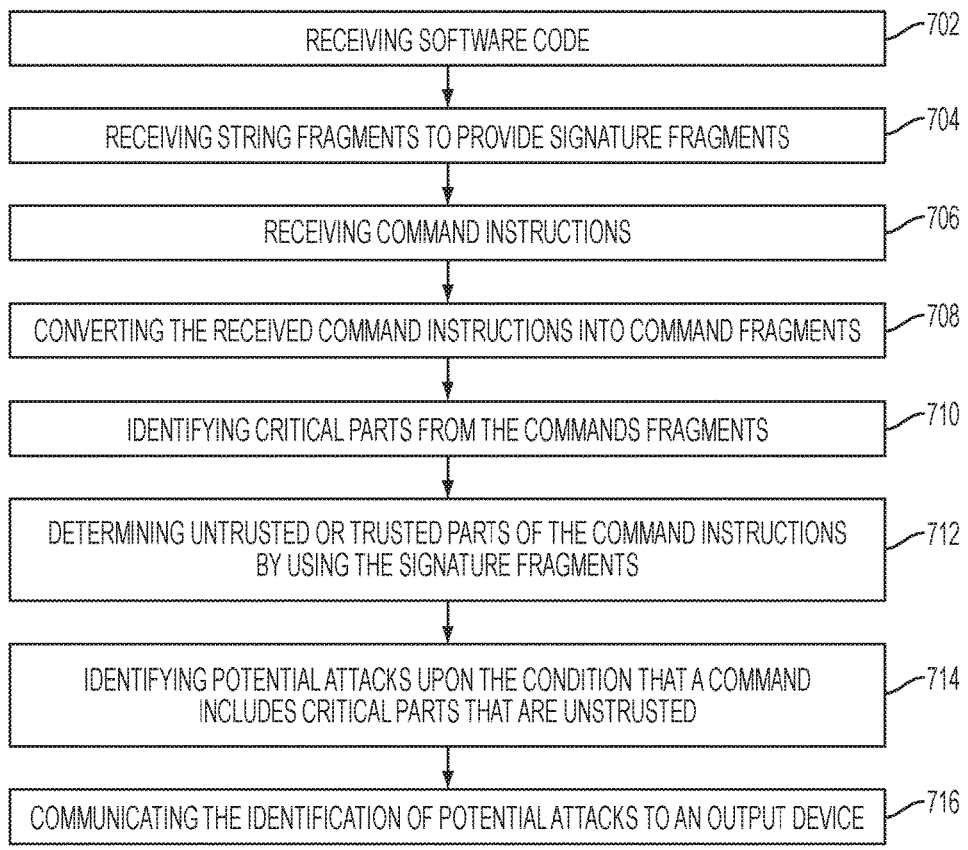
FIG. 17 provides a flow chart depicting an aspect of an embodiment of the present invention computer related method and corresponding system or device.

Referring to FIG. 17, FIG. 17 provides a flow chart depicting an aspect of an embodiment of the present invention computer related method that may include the following steps: receiving software code 702; receiving string fragments to provide signature fragments 704; receiving command instructions 706; converting the received command instructions into command fragments 708; identifying critical parts from the commands fragments 710; determining untrusted or trusted parts of the command instructions by using the signature fragments 712; identifying potential attacks upon the condition that a command includes critical parts that are untrusted 714; and communicating the identification of potential attacks to an output device 716.

It should be appreciated that an embodiment may entail a system that comprises an assembly of hardware component modules (or firmware) configured to perform the functions of the enumerated steps.

EXAMPLES

Practice of an aspect of an embodiment (or embodiments) of the invention will be still more fully understood from the following examples and experimental results, which are presented herein for illustration only and should not be construed as limiting the invention in any way.

Example and Experimental Results Set No. 1

A. Architecture and Related Method

Figure 1:
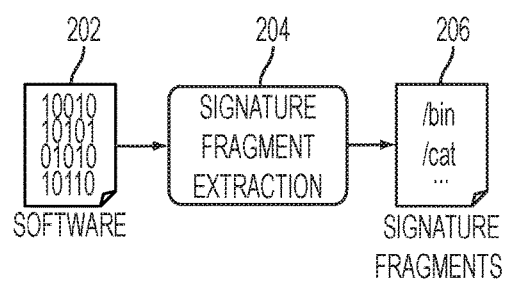
FIG. 1 provides a schematic illustration of an aspect of an embodiment representing the fragment extraction component or module, or related method.

FIG. 1 provides a schematic illustration of an aspect of an embodiment representing the fragment extraction component or module 204 that extracts string fragments, from the binary code 202 and its associated libraries to obtain signature fragments 206. This analysis may be done once, prior to program execution, and the analysis time and therefore would not be counted against the run-time overhead.

Figure 2:
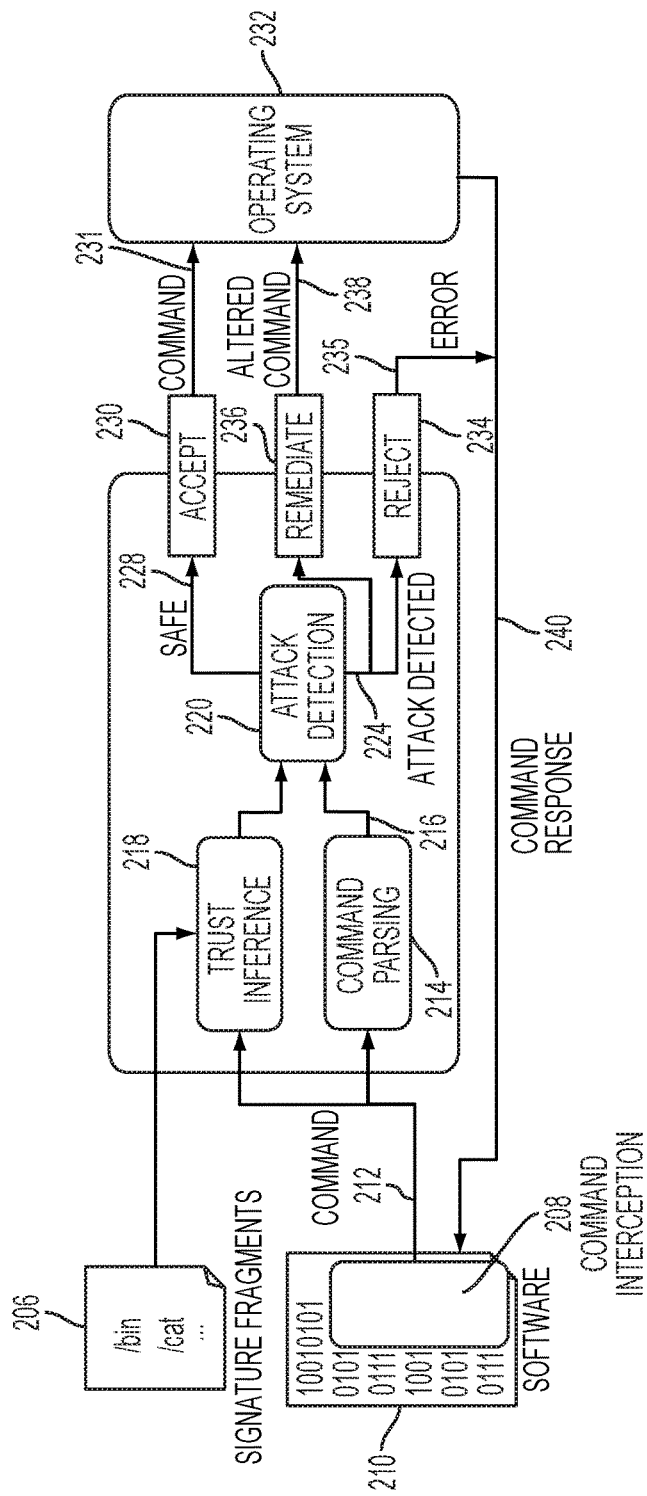
FIG. 2 provides a schematic illustration of an aspect of an embodiment representing the various run-time components or modules; and related method (alternatively may be off-line or in part off line).

FIG. 2 provides a schematic illustration of an aspect of an embodiment representing the various run-time components or modules. (alternatively they may be off-line or in part off line).

The command interception component or module 208 intercepts security-critical commands so that they can be vetted. The trust inference component or module 218 determines which characters in the intercepted command should be trusted by matching the command against the extracted string fragments, i.e., signature fragment 206. Any unmatched character is deemed untrusted. Combining fragments native to the protected binary to infer trust is a novel form of positive taint inference and one of the advantages associated with an embodiment the present invention architecture.

The command parsing component or module 214 parses the intercepted command to identify critical tokens and keywords. The attack detection component or module 220 combines the output of the trust inference component/module 218 and command parsing component/module 214 to determine whether an attack has occurred. A command is deemed an attack if a critical token or keyword is marked as untrusted.

Upon attack detection, an embodiment of the present invention system or method that either rejects 234 the command outright and returns an error code 235, or it alters 238 the command before passing it on to the operating system 232 (or other command interpreter). Altering may entail changing a part of the command or removing a part of the command. The current prototype uses a simple form of error virtualization that simulates a failed command invocation by substituting an error code in place of the actual command [See 24], [See 25].

To illustrate how an embodiment may work, the present inventors use the following vulnerable program as a working example:
    char *path="/bin";
    int main(int argc, char** argv) {
        char cmd[100];
        snprintf(cmd, 100,
            "% s/cat % s", path, argv[1]);
        system(cmd);
    }

B. Example with Benign Input

When the program in the working example is passed a benign input such as "README", the resulting command is shown in the first line of FIG. 3A. The Trust Inference component annotates each character in the command (B denotes that the character is trusted, U denotes untrusted), as denoted by the second line of the figure.

In this case, /bin/cat is trusted as it matches the composition of the signature fragments "/bin" and "/cat" extracted in the offline signature Fragment Extraction process (see FIG. 1). The command parsing component 214 identifies critical tokens and keywords (c denotes critical), as shown in the third line of the FIG. 3A. Lastly, the Attack Detection component 220 takes as input the intercepted commands along with all annotations and marks any critical command that is not trusted. Since all critical commands are trusted, the command is determined to be legitimate and is allowed to execute.

C. Example with Attack Input

Consider the malicious input README; rm -fr * that seeks to recursively delete user files. The resulting command is shown in FIG. 3B. Like the other example, the Trust Inference component annotates each character in the command. Again, only /bin/cat matches the extracted fragments. The Command Parsing component identifies critical tokens and keywords, like before, except that this time the semicolon, rm command, and the -fr flags identified as critical, as shown on the third line. Lastly, the Attack Detection component is invoked, and detects that there are critical command characters that are untrusted (shown with asterisks on the fourth line of FIG. 3B). Since this particular embodiment of the system and method has detected the attack, an appropriate remediation technique can be applied. The program can be shut down or the command can be blocked or sanitized before allowing it to be passed to the operating system.

Example and Experimental Results Set No. 2

Software, System and Method Detailed Overview

While the present illustration architecture is generic, e.g., it could be applied to web applications, mobile applications, or the like as discussed throughout the present disclosure, the present inventors present details and discuss challenges encountered as the inventors map the software, system and method into a practical instantiation to defeat OS command injection attacks for binary programs.

A. Signature Fragment Extraction

The accuracy of the fragment extraction process may be crucial. If fragments are missed, valid commands might be flagged as injections. If extra fragments are extracted, malicious command injections might not be flagged (See Example Set No. 4 at Section B for further discussion).

1) String Extraction:

Extracting string fragments from binary programs is more difficult than it first appears. The present inventors' first attempt used the Linux program strings, which linearly scans a binary program and extracts null-terminated sequences of ASCII characters that have a length larger than a given threshold. Unfortunately, short strings are sometimes important. Consider this C++ snippet:

string q="rm";
    q+="-f";
    q+=filename;
    system(q.c_str ( ));

which creates and executes an OS command.

Using strings, the threshold needs to be sufficiently low to find short strings. Unfortunately, low thresholds tend to yield lots of garbage strings, which affects accuracy. Furthermore, compilers use many optimizations that can make strings harder to detect. For example, to initialize a string on the stack, a compiler might use a sequence of store instructions:

mov [esp+28], 0x2d206d72 # "rm-"
    mov [esp+32], 0x00002066 # "f \0\0"

Each move stores four bytes onto the stack, ultimately creating the proper null-terminated string. Other compiler idioms may complicate accurately finding all strings, as well. The present inventors have seen examples of the compiler inlining some standard library functions that have constant operands, such as memcpy (dst, "rm -f", 6). This optimization yields in-lined constants much like the previous string initialization example. Lastly, strings reports all strings in the executable file, which can include debug information, shared library names, compiler-version identifiers, etc. As these types of strings cannot be used to form OS commands, they should be excluded from consideration.

To deal with these issues, the present inventors use static analysis of the program to derive the string fragments. The static analysis starts by fully disassembling the program into a database which holds each instruction in the program, indexable by address, function, and control flow information. The present inventors use a hybrid linear-scan disassembler and recursive-descent disassembler to ensure we get good coverage of all instructions, as described by Hiser. et al. [See 26], [See 27].

After disassembly is complete, the instructions are scanned for accesses or creation of string values. The present inventors analyze each instruction's immediate operands and apply three heuristics to identify string fragments:

Check if the immediate value holds the address of a program location and the location is the beginning of a sequence of printable characters or one printable character terminated by a null byte.

Check immediate values to see if they contain a string fragment. Attempt to combine immediate values of sequential instructions to form one string fragment. This heuristic handles the case of strings constructed via sequential store instructions, as described in the previous example.

Check immediate values for PIC-relative addressing that might point to a string in PIC code.

Finally, we check for other string fragments or string pointers in data sections.

2) Post-Processing of Signature Fragments:

Programs compiled from C or C++ often contain statements that use format specifiers, e.g. % d, % f, % s, % x. We split such fragments into their constituent sub-fragments using the format specifiers as delimiters. A fragment such as "/bin/rm -f % s; /bin/touch % s"

would be split into the sub-fragments "/bin/rm -f", and "; /bin/t ouch". As the analysis cannot be sure that such fragments are used as format strings, the original fragment as well as the sub-fragments are retained in the list of signatures.

FIG. 4 shows a representative sampling of the Signature fragments from the Spam Assassin program. The length of the fragments range from 1-111 characters. Because of the % s specifier, Fragment 11 expands into sub-fragments 34 and 173. Likewise, fragment 46 expands into fragment 57 and 314. Fragments 273-282 are likely spurious and result from the inherent imprecision of static analysis on binaries.

The present inventors noticed the short fragments that contain potentially dangerous shell metacharacters (fragments 306-315), or short fragments that could be composed in an attack (fragments 273-288). In Example Set No. 2 at Section E and Example Set No. 3, the present inventors discuss how the software, system and method policies deal with short and potentially dangerous fragments. FIG. 4 provides sample fragments manually extracted from SpamAssassin Miller Plugin [See 4] (28 shown out of 315 fragments total).

B. Command Interception

For binaries derived from C/C++, commands are typically encapsulated in an Application Programming Interface (API) and accessed via dynamically-linked shared libraries.

The software, method and system prototype may leverages standard library interposition facilities to transparently intercept and wrap function calls to the underlying operating system. The software, method and system intercepts the system, popen, rcmd, and exec family of functions. Other functions could be intercepted as well, but the present inventors have identified these as the primary candidates for OS command injection.

C. Command Parsing

This component is responsible for identifying the security-critical parts of a command. For OS commands, the critical parts consist of command names, options, delimiters, and the setting of environment variables.

The software, method and system prototype uses a simple, combined lexical analyzer and parser. The parser is careful to identify special characters which could indicate the start of a new command (such as the semicolon character), match quotation marks and parentheses, etc. Ideally, the present inventors would use a full, formally-verified lexical analyzer and distinct parser to detect keywords, etc. However, it may be difficult due to the nature of the shell language (bash in our case). Consider this command:

echo Touching $(file); touch 'foobar'

What are the "correct" lexical analysis and parse for this command? The answer depends on the value of the file variable and the output of the foobar executable. If file is set to a single quote character and foobar returns the same thing, then there is exactly one command, echo. Since variables are expanded and sub-processes are executed before the command is parsed, the correct parse cannot be determined a priori. Under most circumstances, though, such odd substitutions are not the case.

For the purposes of detecting OS command injections, we need to know the possible places where a command could be invoked. The present system or method may provide a simple parser for the subject prototype assumes that the structure of the command is not changed by the results of executing subcommands. In the case of the present inventors' simple example, the parser marks the command like so:

```
echo Touching $(file); touch 'foobar'
cccc          cccccccc cccc c      c
``` where C indicates that a critical command character exists at the given location.

D. Trust Inference

Conceptually, the Trust Inference component infers which portions of the command come from within the program, and which ones come from external sources. To accomplish this step, it checks each substring in the command to determine if that location is within the set of signature fragments. This pseudocode illustrates the process:

for each signature fragment, f
 for each position, i, in the command
  L=len (f)
  if f==command [i . . . i+L−1]
   mark_trusted (command [i . . . i+L−1]);

Conceptually, this algorithm and related method could be quite expensive, O ($n^3$) where n=max(length(sig), #sigs, length(command)). In practice, though, the present inventors use a move-to-front heuristic to organize the signature fragments required to trust commands and exit the outermost loop when enough of the command is trusted to verify its safety. Further, each command and each signature fragment is typically short, on the orders of tens or hundreds of characters. These simple observations and adjustments dramatically reduce the time necessary to make the inference. Example Set No. 3 at Section D empirically evaluates the overhead associated with inferring trust markings.

E. Attack Detection

Attack detection may consist of scanning the command for any character that has been marked as untrusted by the Trust Inference component and critical by the Command Parsing component. In addition, it may desirable to impose the constraints shown in FIG. 5 that command names, shell metacharacters used for starting subcommands and their associated command names, option flags, and environment variable names must come from a single signature fragment (same fragment origin policy).

This policy helps to compensate for the case when a short, critical token, such as a semi-colon or a quotation mark, is present in the set of signature fragments. Such fragments allow attackers great latitude to create strings that append new commands, as in "; rm -rf". Unfortunately, these signature fragments cannot simply be discarded, because many programs do use such fragments to terminate their commands. However, it appears uncommon for a program to use such fragments to introduce a new command, so the present inventors disallow this behavior entirely. FIG. 5 indicates where attack detection policies might use the same fragment origin policy ([\s] denotes an optional whitespace.

FIG. 6 illustrates how these policies provide overlapping means to detect attacks. The core policy of checking for untrusted critical characters (";" "rm" "-fr" shown in boldface is augmented with the same fragment origin policy (shown with rectangles). Note that rm is covered by three separate policies. Thus, even if; and rm were somehow both extracted as fragments, the attack would still be detected correctly. A policy, for example but not limited thereto, may be carried out with a method, technique, algorithm, software code, device, module or component, or firmware.

When no attack is detected then the software, method and system passes the command to the operating system to execute. However, if an attack is detected, the software, method and system do not pass through the command, but can enact any one of a variety of remediation responses, such as shutting down the program, warning the user and asking for permission to continue, or logging the attack. For the prototype described in this example set, the present inventors chose to return an error code as if the library call had failed. This policy makes sense in many cases, as well-written programs are designed to gracefully handle error conditions. FIG. 6 indicates overlapping policies lo detect attacks.

Example Set No. 4 discusses potential sources of false negatives and false positives, and their implications in further detail.

Example and Experimental Results Set No. 3

Evaluation

To evaluate the security and performance of an aspect of an embodiment of the present invention system and method the present inventors have prototyped a system and applied it to a variety of engineered and real-world benchmarks. This Example Set describes the Experimental Setup, Benchmarks, Performance Evaluation and Security Evaluation in more detail.

A. Experimental Setup

For an evaluation, the present inventors used a 32-bit Virtual Box virtual machine running Ubuntu 12.04 with 4 GB of RAM and a 2 GHz Xeon E5-2620 processor.

B. Benchmarks

To evaluate the performance and security of an aspect of an embodiment of the present invention system and method, the present inventors have collected a variety of benchmarks. For real-world benchmarks with CVE reports, the present inventors used the SpamAssassin Milter Plugin [See 28], an email filter interface for detecting spam, and cbrPager [See 29] version 0.9.16. a program to decompress and view high-resolution images. The present inventors configured SpamAssassin Milter version 0.3.1 with SpamAssassin version 3.3.2 and Postfix version 2.9.6. Both of these programs have real-world OS command injection vulnerabilities.

The present inventors also used a set of vulnerable programs independently developed by MITRE Corporation from real-world, open-source software. Each program was seeded with a command injection vulnerability. This process was repeated to create many variants with the vulnerability at many locations. Each variant has inputs that represent normal program input, as well as exploit inputs.

Finally, the present inventors used a set of small exploitable programs, most less than 100 lines, that were developed by Raytheon. Like the MITRE programs, normal and exploit inputs are provided.

Lastly, to help evaluate performance, the present inventors developed a series of microbenchmarks. These benchmarks create an OS command from command line input, and use a tight loop to execute that command as frequently as possible, doing no other work. There are two dimensions of variation in the micro benchmarks: 1) the command to be executed and 2) the primitive used to invoke the command. There are two possible commands to be executed. The command to be executed in one case is echo hello, and in the second case is bzip2 dickens.txt [See 30], [See 31]. The two cases represent a fast command and a somewhat more reasonable workload that compresses a 775 KB file. Each microbenchmark uses one of the following primitives to invoke the command: execv, popen, or system.

C. Security Evaluation

The present inventors used a combination of programs with reported real-world vulnerabilities, synthetic test programs, and real-world programs seeded with vulnerabilities by an independent testing team to evaluate the strength of an aspect of an embodiment of the present invention system and method.

1) Real-World Attacks: the present inventors evaluated an aspect of an embodiment of the present invention system and method against two reported command-injection vulnerabilities that the present inventors were able to reproduce in open-source binaries.

The first attack, based on CVE-2008-2575, is a command injection in cbrPager [See 32]. To extract images, cbrPager invokes the system library call to execute unzip or unrar on the archive, without sanitizing the filename. By crafting an input such as "; rm -rf *;".cbr and providing it where a filename is expected, cbrPager is tricked into executing a malicious command when it attempts to open the putative file. An aspect of an embodiment of the present invention system and method is to have the ability to detect attempts to open a malicious filename and return an error from the system library call. These actions result in the program displaying a message that the file cannot be opened, and exiting harmlessly.

The second attack, based on CVE-2010-1 132, is a remote exploit in the SpamAssassin Milter Plugin [See 4] (spamass-milter), which integrates the SpamAssassin spam filter with either sendmail or Postfix. The vulnerability occurs when the milter is invoked with the -x "expand" option, to pass the email address through alias and virtusertable expansion to allow emails to be redirected to other accounts. In this case, the popen function is invoked on sendmail with the email address provided from SMTP as an argument, without properly sanitizing the email address, which can contain a pipe character. With an SMTP command such as RCP T TO: <username+: "|rm /var/spool/mail">, arbitrary commands can be executed; with careful crafting, these may be sufficient to open a remote shell. This particular embodiment of the system and method was able to harmlessly block any command injections. The signatures extracted from spamass-milter do not include the vertical bar (pipe) character, foiling any attempt to exploit this weakness. Moreover, the Milter plugin properly error-checks the popen function call, so it continues to function without loss of service in the face of an attempted exploit.

2) Synthetic Attacks: The present inventors evaluated an aspect of an embodiment of the present invention system and method against engineered test suites developed by Raytheon and independently by MITRE. The Raytheon engineered suite consists of 18 microtests demonstrating command injections with 22 good inputs and 35 bad inputs, using 9 different function calls ([f] exec [1, 1e, 1p, v, ve, vp], system and popen) and a variety of input-processing techniques. This particular embodiment of the system and method mitigates all of the bad inputs while breaking none of the good inputs in this test suite.

The MITRE test suite includes 477 OS command injection (based on CWE-78) and 516 OS argument injection (based on CWE-88) test cases [See 33]. These test cases are based on inserting vulnerabilities into seven base programs: Cherokee, grep, nginx, tcpdump, wget, w3c (from libwww), and zsh. Each test case involves inserting a vulnerable call to popen at various locations in the base program. For the CWE-78 test cases, this call invokes nslookup with an unsanitized argument specified from an environment variable or untrusted file. For the CWE-88, the program builds the command using the format string "find/-iname % s." Semicolon characters are properly sanitized when constructing the command, but the user can still include input that has a -exec argument that is ultimately passed to find. Consequently, they could use an input such as "*-exec rm { }\;" to remove files or execute other commands. For each test case, ten good inputs and two bad inputs are provided. In each case, an aspect of an embodiment of the present invention system and method was able to intercept the bad inputs without altering behavior on the good inputs.

D. Performance Evaluation

FIG. 15 provides a table that shows the performance overhead of an embodiment of the present invention system and method. The columns show the type of benchmark, benchmark name, performance timing without and with an embodiment of the present invention system and method and finally an absolute and percentage difference, indicating the slowdown that an embodiment of the present invention system and method introduces. A 95% confidence interval is shown where appropriate.

The present inventors selected two of the benchmarks from the MITRE suite where the seeded vulnerability was in the main loop of a server; most vulnerabilities were injected into startup or shutdown code, and there was no significant performance difference. The seeded vulnerability was set to execute only once, but for timing purposes the present inventors modified the code slightly so that it executed on every request to the server. The benchmarks are based on Cherokee (C-C078-CHER-04-DF09-02) and nginx (C-C078-NGIN-04-DT03-02), two production-quality web servers. An aspect of an embodiment of the present invention system and method performed 50 timings, each consisting of downloading a small html file (574 bytes). Even with the seeded vulnerability in the main loop and the small download size, no statistically significant difference in timing was observed with this particular embodiment of the system and method.

For SpamAssassin Milter, the present inventors wrote a simple client that uses gettimeofday to measure the time spent in processing an email transaction. The present inventors also modified cbrPager to measure the time to render the first page of a 49 MB input file. Like the MITRE benchmarks, these benchmarks show no statistically significant overhead.

Unfortunately, the server applications have relatively high variance due to network latencies, disk caching, etc. To deal with this issue and benchmark worst-case overhead, the present inventors use the microbenchmarks described in Example Set No. 3 at Section C2. For these benchmarks, an aspect of an embodiment of the present invention system and method performs 50 timings, where each timing invokes 10 or 1,000 OS commands for the bzip2 or echo microbenchmark, respectively. The microbenchmarks that invoke bzip2 to compress a file show that an aspect of an embodiment of the present invention system and method causes practically no overhead, only 0.2%. The true worst-case performance overhead is when the program does nothing but issue OS commands, and each OS command invocation completes extremely quickly. This case is represented by the microbenchmark that issues the echo hello command. These benchmarks show that the absolute worst case overhead might be as high as 22%. However, in practice the actual work performed by the program and by executing the OS command clearly dominates the overall run-time. Only our worst-case microbenchmarks demonstrate that a particular embodiment of the system and method generates any measurable overhead.

Figure 7:
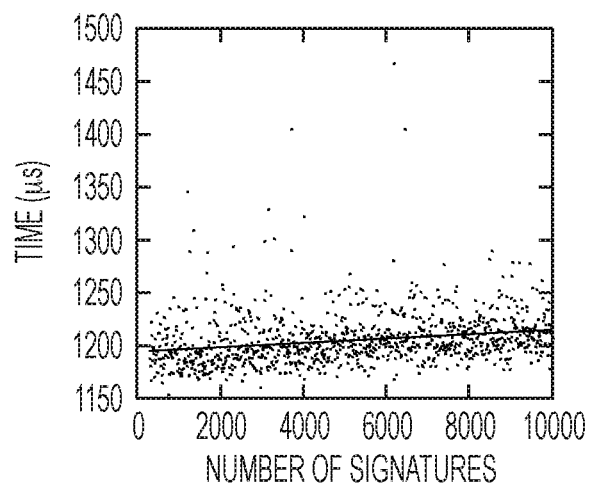
FIG. 7 provides a graphical representation for the time to invoke a particular embodiment of a system versus number of signatures.

To verify the move-to-front heuristic was working properly, the present inventors measured the overhead of the echo microbenchmark that uses the system function to invoke OS commands as the present inventors vary the number of signature fragments. The present inventors automatically added randomly generated strings to the program's DNA fragments. FIG. 7 shows the average time in microseconds for the microbenchmark to execute the system call 100 times, using from 300 to 10,000 signatures (timing starts after steady state has been reached). There is a very slight positive correlation as shown by the line of best fit $y=0.002x; +1194$. The present inventors' investigation indicates that the command processing and matching time after initialization was fixed across the differing number of signatures, but that as there are more signatures in the process's address space, the fork system call (used to implement system) takes longer. The present inventors suspect this is a result of taking slightly longer to copy additional page table entries for the new process.

Figure 8:
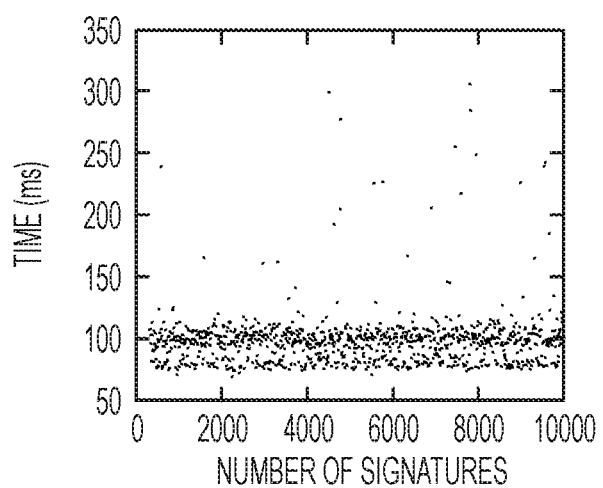
FIG. 8 provides a graphical representation for the average email transaction versus number of milter signatures.

In practice, this additional overhead is negligible since most programs have few signatures. For example, SpamAssassin Milter has 316 signatures and nginx has 2,017. FIG. 8 shows the average time in milliseconds to process an email transaction over 50 trials applying this particular embodiment of the system and method with from 320 to 10,000 signatures to SpamAssassin Milter, which shows no trend. The present inventors would not have expected to see any correlation, given an expected increase of only 20 microseconds based on our microbenchmark and the higher time variance of the email benchmark.

Based on these microbenchmark and real-world benchmark performance results, the present inventors believe that in practice an aspect of an embodiment of the present invention system and method would introduce no measurable overhead, and is the fastest OS command injection detector to date.

E. Analysis Time

An aspect of an embodiment of the present invention system and method measured the time for offline analysis (i.e., signature Fragment Extraction) of the real-world benchmarks. The results are shown in the table of FIG. 16. This table shows the size of the analyzed executables and libraries, the entire static analysis time, and the portion of that time spent in fragment extraction and processing. This analysis needs to be performed only once. These results show the analysis taking up to four minutes for nginx. The time is dominated by the disassembly and IR recovery steps that can be shared by other binary analyses and protections. The actual time devoted to string extraction and post-processing amounts to about 2% of the analysis, completing in between 0.5 to 8 seconds on our benchmarks.

In summary, an aspect of an embodiment of the present invention system and method provides, among other things, a new, efficient, approach for detecting faint markings based on positive taint inference. The present inventors' findings indicate that an aspect of the particular system and method can be effectively used to detect OS command injection attacks on binary programs. Furthermore, an aspect of an embodiment of the present invention system and method has demonstrated that it can be used in many real-world situations because it has negligible performance overhead and can be applied directly to binary programs without need for source code or compiler support.

Example and Experimental Results Set No. 4

4.1 Signature Fragment Extraction

The goal of signature fragment extraction is provided to extract string fragments, i.e., signature fragments, from the binary software and its associated libraries. It may include steps of Signature Fragment Mining and Signature Analysis and Filtering.

(a) Signature Fragment Mining

A purpose of this step is to analyze the software and extract possible command fragments from the software program. In a subsequent step, the signature fragment matching step, command fragments will be reassembled using a variety of techniques to match parts of commands issued by the software program.

Depending on how the software is delivered, e.g. as a binary file, a binary file with a set of libraries, as a set of source files, as byte code, as assembly language code, as a text file in a scripting language, different methods may be used to identify potential fragments. These methods include:

using the 'strings' utility (shipped by default on a typical Unix system) to look for potential strings in a program or file;

using tools similar to the Unix 'strings' utility on Windows (e.g., http://technet.microsoft.com/en-us/sysinternals/bb897439.aspx);

using more sophisticated tools that process the language in which a program is expressed to identify potential fragments; and monitoring the execution of a program to look for potential signature fragments. For example, a monitor could record all queries sent to a database and use data mining techniques to infer valid signature fragments.

Signature fragments may also be specified manually. Note that signature fragments may be represented in multiple ways, including as strings or binary format.

(b) Signature Fragment Analysis and Filtering

A purpose of this step is to further process signature fragments to aid in the Signature Matching process (later described below in this Set Number in the signature fragment matching section). This is an example of post-processing. This step may include:

filtering out previously identified signature fragments;

expanding signature fragments based on knowledge of various characters embedded in the fragments. For example, in the signature fragment:

SELECT * from users where id='% s'

% s would typically denote a string when the program was written in the C or C++ programming language. In this case, one may wish to expand the signature fragment by adding the following two fragments:

SELECT * from users where id=' and the fragment '. The exact details on how to expand signature fragments will depend on the language in which the software program is expressed; and associating additional information which each signature fragment. For example, one can record information about how the signature fragments were obtained, where they came from in the software program, how often they were used in the program, and confidence level in the signature fragment.

Note that this step is optional as signature fragments generated in the Signature Fragment Mining step may be used directly.

4.2 Trust Inference (AKA Signature Fragment Matching)

A purpose of this step is to analyze commands emitted by the software program and locate signature fragments that are contained within the command. For example, a program may emit the following command to access a database:

command: SELECT * from users where userid='john';

If the fragments included the following:

fragment 1: bob the frog
fragment 2: SELECT * from users
fragment 3: where userid='
fragment 4: ';

Then the matching process would find that the following parts of the command were made up from fragments (shown underlined):

SELECT*fromuserswhereuserid='john';

In this example, the only part of the command that is not matched by a string fragment would be: john Another convention of representing the same effect would be as follows:

Then the matching process would find that the following parts of the command were made up from fragments (shown with 'T's for trusted, 'U's for untrusted):

SELECT*fromuserswhereuserid='john';

TTTTTTTTTTTTTTTTTTTTTTTTTTTTTTT-
   TUUUUTT

There are many possible ways to find fragments within a command. Examples include:

methods that attempt to match all fragments against any parts of the command;

methods that match fragments starting from the longest fragments and then attempts to mach using progressively shorter fragments;

methods that can handle fragments that contain special notation to guide the matching process. These are sometimes referred to as wildcard specifiers or regular expressions; and methods that use approximate matching rules, i.e., methods that do not require an exact match between a fragment and the command.

For the remainder of this exposition, the present inventors will refer to the portions of the command that have been matched against a signature fragment as vetted. As mentioned above, another convention would be designated as trusted (as designated with a 'T').

The signature fragment matching process may be carried out in several ways, including:

intercepting commands emitted by the program using an interception or interposition method. This method is advantageous, as it does not require direct modification of the program. For example, library interposition techniques may be used on Unix systems to intercept commands. Analogous facilities to intercept library calls may be used on Microsoft Windows operating systems;

receiving commands from an input channel;

using operating system tracing facilities, e.g. ptrace; and transforming the program to perform this step prior to emitting commands.

This approach may be implemented with a variety of techniques, including using source-to-source transformers, static rewriters, dynamic rewriters.

4.3 Detection

A purpose of this step is to detect suspicious commands that may indicate that an entity is carrying out an attack or is otherwise trying to manipulate emission of various commands emitted by the software program.

Detection is performed by analyzing a command and checking whether critical parts of the command have been vetted in the signature fragment matching step. If a critical part of a command has not been vetted, then this provides a strong indication that an attack is underway.

(a) Command Parsing

A command parsing component is provided for identifying the security-critical parts of a command. Some examples of critical parts of a command may include, for example, critical tokens and keywords.

Determining what is critical depends on the nature of the command and what resources may be accessed via the command. Consider the case of queries to a database expressed in the Structured Query Language (SQL). The present inventors use two different commands.

Command 1: select*fromuserswhereuserid='john';

Command 2: SELECT*fromuserswhereuserid=' 'OR 1=1; -- john';

Then the command parsing process would find that the following parts of the command were security-critical parts (shown with 'C' for critical; and left blank if not critical):

```
SELECT * from users where userid='john';
CCCCCC  CCCC       CCCCC      CC    CC SELECT * from users where userid=' '
CCCCCC  CCCC       CCCCC      CC  C OR 1 = 1; -- john';
CC   C  C CCCCCCCCC
```

Note that in many cases establishing whether a given portion of a command is deemed critical (and should be checked to see whether it is vetted) may involve a process known in the computer science literature as parsing a string with respect to a given language. This process is somewhat analogous to identifying the parts of speech in a language such as English. Using this analogy, one could deem verbs (but not nouns) to be critical. In the first example, the string john is not deemed critical as it corresponds to data once the command is parsed with respect to SQL. However, the string OR is deemed critical as it corresponds to an instruction in the query. In fact, this query would return all users contained in the database, which would represent a severe leakage of information.

(b) Attack Detection

One could use the policy that SQL keywords or tokens contained in the command should be vetted.

In the first example (vetted portions of the command are shown underlined),

```
SELECT * from users where userid='john';
TTTTTTTTTTTTTTTTTTTTTTTTTTTTTTTTTUUUUTT
cccccc   cccc      ccccc       cc    cc
``` all relevant SQL keywords tokens are vetted, therefore the command is deemed valid. In the second example,

```
SELECT * from users where userid=' ' OR 1 = 1; -- john';
TTTTTTTTTTTTTTTTTTTTTTTTTTTTTTTUUUUUUUUUUUUUUUUUUUUUTT
cccccc   cccc      ccccc       cc c cc    c  c cccccccc
``` there are multiple parts of the commands that are not vetted (i.e., not matched and therefore designated as untrusted, U) and that correspond to a critical SQL keyword or token (i.e., critical ant therefore designated a critical, C): ' OR=; --
This command is therefore deemed suspicious.

If a command is deemed normal (nothing suspicious has been detected), then the query can be issued normally. However, if a command is deemed suspicious, several remediation policies may be applied (Example Set No. 4 at Section 4.5).

4.4 Validation

Note that the detection step may yield both false positives and false negatives.

For example, if the signature fragment matching step does not identify a critical part of a command as vetted, then the detection step will deem the command suspicious when it should not. The error represents a false positive.

If the signature fragment mining or the signature fragment analysis and filtering steps yield a signature fragment that would be used in an attack, then this signature fragment would be vetted, and therefore the malicious command would evade detection. This error represents a false negative.

Several techniques may be used to minimize false positives, including:

executing the software program under a test suite. If any commands are deemed suspicious during the execution of the test suite, then the commands that were deemed suspicious may be analyzed in order to extract further signature fragments. These fragments may then be added to the set of signature fragments that will be used in the signature fragment matching step;

executing the software program under a test suite and monitoring commands issued by the software program to find common patterns in the commands.

These patterns may then be used to generate further signature fragments;

using more sophisticated algorithms in either the signature fragment mining or the signature fragment analysis and filtering steps; and using additional heuristics in the detection steps to exclude certain patterns from resulting in an alert. For example, one could use a policy to raise an alert when a critical part of a command is not vetted only if previous parts of the command have been vetted.

Several techniques may be used to minimize false negatives, including:

removing signature fragments shorter than a certain length;

using fault injection techniques to force the program to issue suspicious command and making sure that these commands result in an alert. If the command is not detected as suspicious, then the set of signature fragments can be analyzed to determine which fragment caused the suspicious command to not be detected. The offending fragment could then be removed; and Note that when seeking to minimize false positives or negatives, or in general, when using signature fragments, any of the information associated with the fragments may be used. Finally, the validation step is optional, as the rate of false negatives or positives may already fall within acceptable ranges.

4.5 Remediation

Once a command is deemed suspicious, a wide array of policies may be applied.

Example policies include:

terminating the software program;

logging that a suspicious command is being attempted;

alerting a supervisory remote computer that a breach is being attempted;

notifying an administrator of the suspicious command;

not issuing the command but returning an error code;

not issuing the command but returning a non-error code;

issuing a known bad command and returning the resulting error codes;

displaying an alert to the end user; and any combination thereof.

4.6 Monitoring

Once a command is deemed suspicious, or at a desired time or predetermined time, a wide array of policies may be applied.

Example policies include:

enabling more expensive dynamic analysis for the command interpreter as the command instruction is executed, running the command interpreter within a VM to contain possible attacks. And rejecting the command, but turning on more expensive analysis (again, taint tracking) for the application after realizing that the system may be under attack The monitoring may include methods like "expensive dynamic analysis." It may be more efficient to do it on suspicious command injections, but it is not a requirement.

Example and Experimental Results Set No. 5:
Preventing SQL Injection Attacks

In this embodiment of the present invention, the software program is written in the C language. While this embodiment of the invention operates directly on the compiled binary form of the program, the C source code is shown for a simple example program to aid in the understanding of Applicant's invention. In this example, the program issues commands and accesses results from a back-end Postgres database server via several functions: PQfinish, PQconnectdb, PQexec, PQstatus, PQresultStatus. PQClear. The set of functions used to access the database server is often referred to as an API, or Application Programming Interface. While the present inventors show examples of API functions for the Postgres database, the present inventors note that other databases typically offer their own API functions.

In general, an API will be available for any commands of interest.

5.1 C Source Code

```
#include <stdio.h>
#include <stdlib.h>
#include "libpq-fe.h"
void exitNicely(PGconn *p_conn)
{
   PQfinish (p_conn);
   exit (1);
}
int main(int argc, char **argv)
{
   char conninfo[1024];
   char query[1024];
   PGconn *conn;
   PGresult *res;
   sprintf(conninfo, "dbname=% s", getenv("PGDATABASE"));
   conn=PQconnectdb(conninfo);
   if (PQstatus(conn) !=CONNECTION_OK)
   {
   fprintf(stderr, "Connection to database failed: % s", PQerrorMessage(conn));
      exitNicely(conn);
   }
   // this line is vulnerable to SQL injection
   sprintf(query, "select * from doip where comment='% s';", argv[1]);
   res=PQexec(conn, query);
   if (PQresultStatus(res)==PGRES_TUPLES_OK)
   {
   fprintf(stderr, "Query success: % s\n", query);
   }
   else
   {
   fprintf(stderr, "Query failed: % s\n", query);
   }
   PQclear(res);
   PQfinish(conn);
   return 0;
}
```

5.2 Signature Fragment Extraction (a) Signature Fragment Mining

To identify the initial set of signature fragments an embodiment of the present invention method and system may process the binary that results from compiling the C source code example with the Unix strings utility. Possible fragments produced are:

[^_]
_bss_start
Connection to database failed: % s
dbname=% s
_edata
_end
exit
_fini
fprintf
getenv
GLIBC_2.0
GLIBC_2.4
_gmon_start_
_init
_IO_stdin_used
_Jv_RegisterClasses
libc.so.6
_libc_start_main
/lib/ld-linux.so.2
libpq.so.5
PGDATABASE
PQclear
PQconnectdb
PQerrorMessage
PQexec
PQfinish
PQresultStatus
PQstatus
PTRh0
Query failed: % s
Query success: % s
select * from doip where comment='% s';
sprintf
_stack_chk_fail
stderr Note that many of the strings in the C source code are successfully extracted from the program binary.

(b) Signature Fragment Analysis and Filtering

In this step of post processing, signature fragments that correspond to function names are filtered out, along with common symbol names and strings that correspond to well-known libraries. This can be done using the nm facility in Unix or other tools to extract symbol name information. Furthermore, signature fragments that contain % s or other format string specifiers can be replaced with signature fragments that are generated by removing the % s. For example, the fragment:

select * from doip where comment='% s';

can be replaced with the following fragments:

select * from doip where comment='
';

The final set of signature fragments produced by this step is:

select * from doip where comment='
Connection to database failed:
Query success:
Query failed:
PGDATABASE
dbname=
PTRh0
[^_]
';

The signature fragments may then be stored in a file (or other form of persistent storage), or in memory, so that they can be used during the signature fragment matching step. Alternatively, signature fragments may denote a pattern to be used in the matching process.

5.3 Trust Inference (AKA Signature Fragment Matching)

Using the interposition facilities in modern Unix systems, API function calls related to issuing commands to the database are intercepted. As an example of interposition, the code below illustrates how calls to PQexec, one of the major function for issuing commands to the database, are intercepted:

```
PGresult* PQexec(PGconn* p_conn, const char *p_query)
{
```

```
static PGresult* (*my_pgExec) (PGconn*, const
char *)=NULL;
  if (!my_pgExec)
  {
  my_pgExec=dlsym(RTLD_NEXT, "PQexec");
  }
  char *errMsg=NULL;
  if (sqlfw_verify(p_query, &errMsg))
  {
  PGresult *ret=my_pgExec(p_conn, p_query);
  return ret;
  }
  else
  {
  // remediation policy: issue bad query on purpose and
    return resulting error
  PGresult *ret=my_pgExec(p_conn, "not a query -force
    error");
  return ret;
  }
}
```

This code intercepts the calls to PQexec which then enables the signature fragment matching, the detection and the remediation steps. The function sqlfw_verify ( ) encodes the signature fragment matching and detection steps. If the query command (p_query) is deemed normal then the query is passed through to the original function that implements PQexec. Otherwise, if the query command is deemed to be suspicious, then a remediation policy is applied.

Consider the case where the program input yields a command query that is not an attack:
select * from doip where comment='bob';

The fragment matching process would mark the following characters as vetted (shown underlined, and can also be designated as trusted, 'T', or untrusted, 'U'.):
select*fromdoipwherecomment='bob';
TTTTTTTTTTTTTTTTTTTTTTTTTTTTTTTTTT-
TUUUTT In the case when the command query is an attack, e.g.:
select * from doip where comment=' 'or 1=1; -- bob';

The attack would result in a leak of all entries from the doip table. The fragment matching process would mark the following characters as vetted (shown underlined, and can also be designated as trusted, 'T' or untrusted, 'U'.):
select*fromdoipwherecomment=' 'or 1=1; --bob';
TTTTTTTTTTTTTTTTTTTTTTTTTTTTTTTTTT-
TUUUUUUUUUUUUUUUUTT
5.4 Detection To determine whether the query command is malicious, Applicant parses the query string to look for critical parts (shown with 'C' for critical; and left blank if not critical) of the commands that are not vetted. In the case of the normal query:

```
    select * from doip where comment = 'bob';
    TTTTTTTTTTTTTTTTTTTTTTTTTTTTTTTTUUUTT
    CCCCCC   CCCC     CCCCC         C C  CC
```

All critical parts of the command, i.e., SQL keywords and tokens such as select from where =' '; are all vetted.
However, in the case of an attack:

```
select * from doip where comment = '' or 1=1; --bob';
TTTTTTTTTTTTTTTTTTTTTTTTTTTTTTTTTTUUUUUUUUUUUUUUUTT
CCCCCC   CCCC    CCCCC         C CC CC   C C CCCCCCC
``` there are multiple SQL keywords and tokens, i.e., ' or =; -- that are not vetted.

If a command is deemed normal, i.e. non-malicious, the present method and system may go ahead and let the command be issued. Otherwise, if a command is deemed suspicious, i.e. a potential attack, the user or system may perform some remediation action.
5.5 Remediation Once an attack is detected, there are multiple remediation actions that are possible. In this example, the present inventors generate a malformed query command intently, execute this malformed query, and return any resulting errors to the software program.
5.6 Validation In this example, the present method and system may does not attempt to perform any validation of the detection algorithm. However, if a regression test were supplied with the software program, the present method and system may execute the program with known non-malicious test inputs. If any inputs resulted in a detection of an attack, then the inputs could be analyzed to generate further signature fragments. Alternatively, the present inventors could create tests manually or by recording all inputs given to the program during a user session.

If attack inputs were supplied or published, the present inventors could verify that the detection algorithm detected the attack. If the detection step did not detect the attack, we could judiciously remove signature fragments until the attack was detected.

Example and Experimental Results Set No. 6:
Preventing OS Injection Attacks

In this embodiment, the original software program is also written in the C language. However, as was the case with the embodiment discussed in Example Set No. 3, an embodiment of the present invention may operate directly on the compiled binary form of the program. In the example shown below, the program issues operating system commands using API functions contained in the standard C libraries, e.g. system.
6.1 C Source Code

```
#include <stdio.h>
int main(int argc, char *argv[ ])
{
  if (argc <2)
  {
  fprintf(stderr, "must specify at least one argument\n");
  return 1;
  }
  char command[2048];
  sprintf(command, "/bin/ls % s", argv[1]);
  int ret=system(command);
  fprintf (stdout, "% s returned with code: % d\n", command, ret);
  return 0;
}
```

6.2 Signature Fragment Extraction
  (a) Signature Fragment Mining
  To identify the initial set of signature fragments an embodiment of the present method and system may process the binary that results from compiling the C source code example with the Unix strings utility. The fragments produced are:
[^_]
/bin/ls % s
fprintf
fwrite
GLIBC_2.0
GLIBC_2.4
_gmon_start_
_IO_stdin_used
libc.so.6
_libc_start_main
/lib/ld-linux.so.2
must specify at least one argument
PTRh
QVh4
sprintf
% s returned with code: % d
_stack_chk_fail
stderr
stdout
system (b) Signature Fragment Analysis and Filtering (e.g., Post-Processing).

Using similar techniques as those described in Section (b) of this Example Set No. 6, the final set of signature fragments produced is:
[^_]
/bin/ls
must specify at least one argument
PTRh
QVh4
returned with code:

6.3 Trust Inference (AKA Signature Fragment Matching)

Using the interposition facilities in modern Unix systems, API function calls related to issuing operating systems commands are intercepted. These functions include: system, popen, rcmd, fexecve, execve, execl, execle, execv, execvp, execvpe, execlp.

Consider the case when the command is not an attack, for example when a file is supplied to the program. The resulting command would be:
/bin/ls myFile The fragment matching process would mark the following characters as vetted (shown underlined, and can also be designated as trusted, 'T' or untrusted, 'U'.):
/bin/ls myFile
TTTTTTT UUUUUU In the case when the command query is an attack, e.g., the program is supplied with the input someOtherFile; cat /etc/passwd The resulting command would be:
/bin/ls someOtherFile; cat /etc/passwd
and would potentially leak the content of the password file contained on the user's machine. The fragment matching process would mark the following characters as vetted (shown underlined, and can also be designated as trusted, 'T' or untrusted 'U'.):
/bin/ls someOtherFile; cat/etc/passwd
TTTTTTT-TUUUUUUUUUUUUUUUUUUUUUUUUUUUUUU 6.4 Detection To determine whether the command is malicious, the present method and system may look for critical parts (critical character designated with "C" and non-critical designated by leaving blank) of the commands that are not vetted. In the example:
/bin/ls myFile
TTTTTTTTUUUUUU
CCCCCCC The critical parts (designated with 'C') of the command /bin/ls is marked as vetted (i.e. underlined or with the alternative convention, trusted), and therefore this command is deemed non-malicious.

However, in the case of the following command,

/bin/ls someOtherFile; cat /etc/passwd
TTTTTTTUUUUUUUUUUUUUUUUUUUUUUUUUUUUU
CCCCCCC            C CCC The shell program cat follows the; terminator symbol and is deemed critical. Since cat is not vetted (i.e. without underline or with the alternative convention, untrusted), the command is deemed suspicious.

An embodiment of the current prototype treats the first shell program in the command as critical, and well as any shell programs that follow a separator symbol such as ;, |, ||, &&.

In addition, shell program options and the name of environment parameters are deemed critical. Thus in the following command, the characters shown in boldface are deemed critical:

MYENV=someValue /bin/ls someFile && rm -fr /
CCCCCC              CCCCCCC          CC CC CCC 6.5 Validation In this embodiment, validation is not performed. If desired validation would proceed as described in Example Set No. 4 at Section 4.5 and Example Set No. 5 at Section 5.5.

7 Example and Experimental Results Set No. 7: Additional Notes

The present inventors note that while the SQL injection and OS injection attack examples are presented separately, they can, in practice, be combined into one protection mechanism or approach. In general, an aspect of an embodiment of the present invention allows for the interception of arbitrary API functions, and thus it is in fact quite easy to compose various protections against a wide variety of command injection attacks. Further examples of command injection attacks include: LDAP Injection Attacks, XPATH Injection Attacks, Cross-Site (XSS) Scripting Attacks, Log Injection Attacks, and Format String Attacks. In general, aspects of various embodiments of the present invention may apply to any injection attacks wherein an attacker can manipulate critical parts of a command.

The examples provided illustrated the use of an embodiment of the invention for program binaries compiled from C source code. As was already described in Example Set No. 4, the present inventors note that an aspect of an embodiment of the present invention is generally applicable to, but not limited thereto, a variety of software program types, including software expressed in various scripting languages (Ruby, Python, PHP, Perl, etc.), byte code (e.g. Java byte code, Microsoft's Common Intermediary Language, Dalvik byte code), assembly language, etc. An aspect of an embodiment of the present invention also applies to software program binaries generated from a wide variety of languages, including C and C++, and other languages that are compiled to binary form.

ADDITIONAL EXAMPLES

Example 1

An aspect of an embodiment of the present invention provides, but not limited thereto, a computer method for detecting command injection attacks. The method may comprise: receiving software code; extracting string fragments from the received software code to provide extracted signature fragments; receiving command instructions; converting the received command instructions into command fragments; identifying critical parts from the commands fragments; determining if the critical parts are untrusted or trusted by matching with the extracted signature fragments; identifying potential attacks upon the condition that a command includes critical parts that are untrusted; and communicating the identification of potential attacks to an output device.

Example 2

The method of example 1, further comprises: remediating or rejecting one or more of said identified potential attack commands.

Example 3

The method of example 2, wherein said remediation includes altering the identified potential attack command.

Example 4

The method of example 2 (as well as subject matter of example 3), further comprising: transmitting said remediated command to a command interpreter module.

Example 5

The method of example 4 (as well as subject matter of one or more of any combination of examples 2-3), further comprising: executing said remediated command in said command interpreter; and generating a command response.

Example 6

The method of example 2 (as well as subject matter of one or more of any combination of examples 3-5), further comprising: transmitting said remediated command for execution; and generating said executed command as a command response.

Example 7

The method of example 2 (as well as subject matter of one or more of any combination of examples 3-6), wherein said remediation of said identified potential attack command includes providing one or more of the following instructions: terminating the software program, repairing the potential attack command, enabling additional system monitoring, enabling additional analysis, logging that a suspicious command is being attempted, alerting a supervisory remote computer that a breach is being attempted, notifying an administrator of the suspicious command, not issuing the command but returning an error code, not issuing the command but returning a non-error code, issuing a known bad command and returning the resulting error codes, displaying an alert to the end user, or any combination thereof.

Example 8

The method of example 1 (as well as subject matter of one or more of any combination of examples 2-7), wherein said identifying critical parts includes at least one of the following: parsing, dissecting, lexical analyzing, or tokenizing.

Example 9

The method of example 1 (as well as subject matter of one or more of any combination of examples 2-8), wherein said extracting comprises a string extracting technique, and said method further comprises: post-processing of said extracted signature fragments.

Example 10

The method of example 9 (as well as subject matter of one or more of any combination of examples 2-8), wherein said post-processing may comprise one or more of the following: removing said extracted signature fragments; adding said extracted signature fragments; modifying said extracted signature fragments; or annotating said extracted signature fragments with additional information Example 11

The method of example 1 (as well as subject matter of one or more of any combination of examples 2-10), wherein said identifying potential attacks includes using annotations.

Example 12

The method of example 11 (as well as subject matter of one or more of any combination of examples 2-10), wherein said annotations are generated by said post-processing step.

Example 13

The method of example 1 (as well as subject matter of one or more of any combination of examples 2-12), wherein said signature fragments specify patterns.

Example 14

The method of example 13 (as well as subject matter of one or more of any combination of examples 2-12), wherein said patterns comprise one or more of the following: regular expressions, wild-card specifiers, format string specifiers, context-free grammars, or grammars.

Example 15

The method of example 1 (as well as subject matter of one or more of any combination of examples 2-14), wherein if the condition to identify that potential attacks have occurred has not been satisfied then said command is deemed as safe, thereby defining a safe command.

Example 16

The method of example 15 (as well as subject matter of one or more of any combination of examples 2-14), further comprising: transmitting said safe command to a command interpreter module.

Example 17

The method of example 16 (as well as subject matter of one or more of any combination of examples 2-15), further comprising: executing said safe command; and generating a command response.

Example 18

The method of example 15 (as well as subject matter of one or more of any combination of examples 2-14 and 16-17), further comprising accepting said safe command.

Example 19

The method of example 1 (as well as subject matter of one or more of any combination of examples 2-18), wherein said output device includes at least one of the following: storage, memory, network, printer or a display.

Example 20

The method of example 1 (as well as subject matter of one or more of any combination of examples 2-19), wherein said command instructions comprise instructions to an operating system (OS).

Example 21

The method of example 1 (as well as subject matter of one or more of any combination of examples 2-10), wherein said command instructions comprise database commands or structured query language (SQL) instructions.

Example 22

The method of example 1 (as well as subject matter of one or more of any combination of examples 2-21), wherein said command instructions comprise instructions to a format string interpreter.

Example 23

The method of example 1 (as well as subject matter of one or more of any combination of examples 2-22), wherein said command instructions comprise instruction to an LDAP interpreter.

Example 24

The method of example 1 (as well as subject matter of one or more of any combination of examples 2-23), wherein said command instructions comprise instruction to an XPATH interpreter.

Example 25

The method of example 1 (as well as subject matter of one or more of any combination of examples 2-24), wherein said command instructions comprise instructions to a web language.

Example 26

The method of example 1 (as well as subject matter of one or more of any combination of examples 2-25), wherein said command instructions comprise instructions to a scripting language interpreter.

Example 27

The method of example 1 (as well as subject matter of one or more of any combination of examples 2-26), wherein said command instructions comprise instructions to a NoSQL database.

Example 28

The method of example 1 (as well as subject matter of one or more of any combination of examples 2-28), wherein said command instructions include any combination of one or more of the following: instructions to an operating system (OS), instructions to a data base or instructions to an, SQL interpreter, instructions to a web based language; instructions to a format string interpreter; instructions to a LDAP, interpreter, instructions to an XPath interpreter, instructions to a scripting language, and instructions to a NoSQL database.

Example 29

An aspect of an embodiment of the present invention provides, but not limited thereto, a computer method for detecting command injection attacks. The method may comprise: receiving software code; receiving string fragments to provide signature fragments; receiving command instructions; converting the received command instructions into command fragments; identifying critical parts from the commands fragments; determining untrusted or trusted parts of the command instructions by using the signature fragments; identifying potential attacks upon the condition that a command includes critical parts that are untrusted; and communicating the identification of potential attacks to an output device.

Example 30

The method of example 29, wherein said receiving string fragments further comprises extracting string fragments from said received software.

Example 31

The method of example 29 (as well as subject matter of example 30), wherein said receiving string fragments includes one or more of any of the following: receiving from the software developer, downloading from a networked resource, distributed with the software, manually specifying string fragments, or static or dynamic analysis of the software code.

Example 32

The method of example 29 (as well as subject matter of one or more of any combination of examples 30-31), further comprises: monitoring, remediating or rejecting one or more of said identified potential attack commands.

Example 33

The method of example 32 (as well as subject matter of one or more of any combination of examples 30-31), wherein said remediation includes altering the identified potential attack command.

Example 34

The method of example 32 (as well as subject matter of one or more of any combination of examples 30, 31 and 33), further comprising: transmitting said remediated command to a command interpreter module.

Example 35

The method of example 34 (as well as subject matter of one or more of any combination of examples 31-33), further comprising: executing said remediated command in said command interpreter; and generating a command response.

Example 36

The method of example 32 (as well as subject matter of one or more of any combination of examples 30, 31 and 33-35), further comprising: transmitting said remediated command for execution; and generating said executed command as a command response.

Example 37

The method of example 32 (as well as subject matter of one or more of any combination of examples 30, 31, and 33-36), wherein said monitoring, remediation or rejection of said identified potential attack command includes performing one or more of the following actions: terminating the software program, repairing the potential attack command, enabling additional system monitoring, enabling additional analysis, logging that a suspicious command is being attempted, alerting a supervisory remote computer that a breach is being attempted, notifying an administrator of the suspicious command, not issuing the command but returning an error code, not issuing the command but returning a non-error code, issuing a known bad command and returning the resulting error codes, displaying an alert to the end user, or any combination thereof.

Example 38

The method of example 29 (as well as subject matter of one or more of any combination of examples 30-37), wherein said identifying critical parts includes at least one of the following: parsing, dissecting, scanning, tokenizing, or lexical analysis.

Example 39

The method of example 29 (as well as subject matter of one or more of any combination of examples 30-38), further comprising post-processing of said received string fragments.

Example 40

The method of example 39 (as well as subject matter of one or more of any combination of examples 30-38), wherein said post-processing may comprise one or more of the following: removing some of said string fragments; adding additional fragments to said string fragments; modifying said string fragments; or annotating said string fragments with additional information.

Example 41

The method of example 29 (as well as subject matter of one or more of any combination of examples 30-40), wherein said determining untrusted or trusted parts of the command instructions includes using a trust-verification policy.

Example 42

The method of example 41 (as well as subject matter of one or more of any combination of examples 30-40), wherein said trust-verification policy includes ensuring that certain critical parts of said command instructions exactly match one signature fragment.

Example 43

The method of example 29 (as well as subject matter of one or more of any combination of examples 30-42), wherein said identifying potential attacks includes using a trust-verification policy.

Example 44

The method of example 43 (as well as subject matter of one or more of any combination of examples 30-42), wherein said trust-verification policy includes ensuring that certain critical parts of said command instructions exactly match one signature fragment.

Example 45

The method of example 40 (as well as subject matter of one or more of any combination of examples 30-39 and 41-44), wherein said identifying potential attacks includes using annotations.

Example 46

The method of example 29 (as well as subject matter of one or more of any combination of examples 30-45), wherein said identifying potential attacks includes using annotations.

Example 47

The method of example 45 (as well as subject matter of one or more of any combination of examples 30-44 and 46), wherein said annotations are generated by said post-processing step.

Example 48

The method of example 29 (as well as subject matter of one or more of any combination of examples 30-47), wherein said signature fragments specify patterns.

Example 49

The method of example 48 (as well as subject matter of one or more of any combination of examples 30-47), wherein said patterns comprise one or more of the following: regular expressions, wild-card specifiers, format string specifiers, context-free grammars, or grammars.

Example 50

The method of example 29 (as well as subject matter of one or more of any combination of examples 30-49), wherein if the method of identifying potential attacks results in no potential attacks then said command is deemed as safe, thereby defining a safe command.

Example 51

The method of example 50 (as well as subject matter of one or more of any combination of examples 30-49), further comprising: transmitting said safe command to a command interpreter module.

Example 52

The method of example 51 (as well as subject matter of one or more of any combination of examples 30-50), further comprising: executing said safe command; and generating a command response.

Example 53

The method of example 50 (as well as subject matter of one or more of any combination of examples 30-49 and 51-52), further comprising accepting said safe command.

Example 54

The method of example 29 (as well as subject matter of one or more of any combination of examples 30-53), wherein said output device includes at least one of the following: storage, memory, network, printer or a display.

Example 55

The method of example 29 (as well as subject matter of one or more of any combination of examples 30-54), wherein said command instructions comprise instructions to an operating system (OS).

Example 56

The method of example 29 (as well as subject matter of one or more of any combination of examples 30-55), wherein said command instructions comprise database commands or structured query language (SQL) instructions.

Example 57

The method of example 29 (as well as subject matter of one or more of any combination of examples 30-56), wherein said command instructions comprise instructions to a format string interpreter.

Example 58

The method of example 29 (as well as subject matter of one or more of any combination of examples 30-57), wherein said command instructions comprise instruction to an LDAP interpreter.

Example 59

The method of example 29, wherein said command instructions comprise instruction to an XPATH interpreter.

Example 60

The method of example 29 (as well as subject matter of one or more of any combination of examples 30-59), wherein said command instructions comprise instructions to a web language.

Example 61

The method of example 29 (as well as subject matter of one or more of any combination of examples 30-60), wherein said command instructions comprise instructions to a scripting language interpreter.

Example 62

The method of example 29 (as well as subject matter of one or more of any combination of examples 30-61), wherein said command instructions comprise instructions to a NoSQL database.

Example 63

The method of example 29 (as well as subject matter of one or more of any combination of examples 30-62), wherein said command instructions include any combination of one or more of the following: instructions to an operating system (OS), instructions to a data base or instructions to an, SQL interpreter, instructions to a web based language; instructions to a format string interpreter; instructions to a LDAP, interpreter, instructions to an XPath interpreter, instructions to a scripting language, and instructions to a NoSQL database.

Example 64

An aspect of an embodiment of the present invention provides, but not limited thereto, a system for detecting command injection attacks based on command instructions to be received from a client processor or client data memory.

The system may comprise: a memory unit operative to store software code; and a processor. The processor may be configured to: extract string fragments from the software code to provide extracted signature fragments; receive the client command instructions; convert the received command instructions into command fragments; identify critical parts from the commands fragments; determine if the critical parts are untrusted or trusted by matching with the extracted signature fragments; identify potential attacks upon the condition that a command includes critical parts that are untrusted; and communicate the identification of potential attacks to an output device.

Example 65

The system of example 64, wherein said output device includes at least one of the following: storage, memory, network, printer or a display.

Example 66

The system of example 64, wherein the command instructions to be received from the client processor or client data memory includes one or more of the following types: instructions to an operating system (OS), instructions to a data base or instructions to an SQL interpreter, instructions to a web based language; instructions to a format string interpreter; instructions to a LDAP interpreter, XPATH interpreter, instructions to a scripting language, and instructions to a NoSQL database.

Example 67

The system of example 64, wherein said processor is further configured to: reject said command that includes critical parts that are untrusted.

Example 68

The system of example 64, wherein said processor is further configured to: remediate said command that includes critical parts that are untrusted;

Example 69

The system of example 68, wherein said remediation of said identified potential attack command includes providing one or more of the following instructions: terminating the software program, repairing the potential attack command, enabling additional system monitoring, enabling additional analysis, logging that a suspicious command is being attempted, alerting a supervisory remote computer that a breach is being attempted, notifying an administrator of the suspicious command, not issuing the command but returning an error code, not issuing the command but returning a non-error code, issuing a known bad command and returning the resulting error codes, displaying an alert to the end user, or combination thereof.

Example 70

The system of example 68, said remediation includes altering said identified potential attack command.

Example 71

The system of example 68, further comprising: a command interpreter module, and wherein said processor is further configured to: transmit said remediated command to said command interpreter module for execution. to generate a command response.

Example 72

The system of example 68, wherein said processor is further configured to: transmit said remediated command for execution to generate a command response.

Example 73

The system of example 68, wherein said system further comprise: a command interpreter, and wherein said processor is further configured to: wherein if a command does not include critical parts that are untrusted then the command is deemed safe; and accept said safe command and transmit said safe command to said command interpreter module for execution to generate a command response.

Example 74

The system of example 64, wherein said processor is further configured to: remediate or reject one or more of said identified potential attack

Example 75

The system of example 74, further comprising: a command interpreter module, and wherein said processor is further configured to: transmit said remediated command to said command interpreter module for execution. to generate a command response.

Example 76

The system of example 73, wherein said identifying critical parts includes at least one of the following: parsing, dissecting, lexical analyzing, or tokenizing.

Example 77

The system of example 64, wherein said extracting comprises a string extracting technique, and said compute processor being configured to: post-process of said extracted signature fragments.

Example 78

The system of example 77, wherein said post-processing may comprise one or more of the following: removing said extracted signature fragments; adding said extracted signature fragments; modifying said extracted signature fragments; or annotating said extracted signature fragments with additional information.

Example 79

The system of example 64, wherein said identifying potential attacks includes using annotations.

Example 80

The system of example 79, wherein said annotations are generated by said post-processing.

Example 81

The system of example 64, wherein said signature fragments specify patterns.

Example 82

The system of example 81, wherein said patterns comprise one or more of the following: regular expressions, wild-card specifiers, format string specifiers, context-free grammars, or grammars.

Example 83

The system of example 64, wherein said memory unit, said processor, and said client processor or client data memory are disposed within a single device.

Example 84

The system of example 83, wherein said device comprises: smart phone, laptop, computer notebook, iPad, PDA, PC, desktop, tablet, camera, gaming device, or television:

Example 85

The system of example 64, wherein said memory unit and said processor are remotely located from the client processor or client data memory.

Example 86

The system of example 85, wherein said processor is in communication with said client processor or client data memory by a wired network or a wireless network.

Example 87

An aspect of an embodiment of the present invention provides, but not limited thereto, a system for detecting command injection attacks based on command instructions to be received from a client processor or client data memory.

The system may comprise: a memory unit operative to store software code and a processor. The processor may be configured: receive string fragments to provide signature fragments; receive command instructions; convert the received command instructions into command fragments; identify critical parts from the commands fragments; determine untrusted or trusted parts of the command instructions by using the signature fragments; identify potential attacks upon the condition that a command includes critical parts that are untrusted; and communicate the identification of potential attacks to an output device.

Example 88

The system of example 87, wherein said received string fragments are provided by extracting string fragments from said received software.

Example 89

The system of example 87, wherein said received string fragments are provided by one or more of any of the following: receiving from the software developer, downloading from a networked resource, distributed with the software, manually specifying string fragments, or static or dynamic analysis of the software code.

Example 90

The system of example 87, wherein said processor is further configured to: monitor, remediate or reject one or more of said identified potential attack commands.

Example 91

The system of example 90, wherein said remediation includes altering the identified potential attack command.

Example 92

The system of example 90, wherein said processor is further configured to: transmit said remediated command to a command interpreter module.

Example 93

The system of example 92, wherein said processor is further configured to: execute said remediated command in said command interpreter; and generate a command response.

Example 94

The system of example 90, wherein said processor is further configured to: transmit said remediated command for execution; and generate said executed command as a command response.

Example 95

The system of example 90, wherein said monitoring, remediation or rejection of said identified potential attack command includes performing one or more of the following actions: terminating the software program, repairing the potential attack command, enabling additional system monitoring, enabling additional analysis, logging that a suspicious command is being attempted, alerting a supervisory remote computer that a breach is being attempted, notifying an administrator of the suspicious command, not issuing the command but returning an error code, not issuing the command but returning a non-error code, issuing a known bad command and returning the resulting error codes, displaying an alert to the end user, or any combination thereof.

Example 96

The system of example 87, wherein said identifying critical parts includes at least one of the following: parsing, dissecting, scanning, tokenizing, or lexical analysis.

Example 97

The system of example 87, wherein said processor is further configured to: post-process said received string fragments.

Example 98

The system of example 97, wherein said post-processing may comprise one or more of the following: removing some of said string fragments; adding additional fragments to said string fragments; modifying said string fragments; or annotating said string fragments with additional information.

Example 99

The system of example 87, wherein said determining untrusted or trusted parts of the command instructions includes using a trust-verification policy.

Example 100

The system of example 99, wherein said trust-verification policy includes ensuring that certain critical parts of said command instructions exactly match one signature fragment.

Example 101

The system of example 87, wherein said identifying potential attacks includes using a trust-verification policy.

Example 102

The system of example 101, wherein said trust-verification policy includes ensuring that certain critical parts of said command instructions exactly match one signature fragment.

Example 103

The system of example 98, wherein said identifying potential attacks includes using annotations.

Example 104

The system of example 87, wherein said identifying potential attacks includes using annotations.

Example 105

The system of example 103, wherein said annotations are generated by the post-processing.

Example 106

The system of example 87, wherein said signature fragments specify patterns.

Example 107

The system of example 106, wherein said patterns comprise one or more of the following: regular expressions, wild-card specifiers, format string specifiers, context-free grammars, or grammars.

Example 108

The system of example 87, wherein if said identifying potential attacks results in no potential attacks then said command is deemed as safe, thereby defining a safe command.

Example 109

The system of example 108, wherein said processor is further configured to: transmit said safe command to a command interpreter module.

Example 110

The system of example 109, wherein said processor is further configured to: execute said safe command; and generate a command response.

Example 111

The system of example 108, wherein said processor is further configured to accept said safe command.

Example 112

The system of example 87, wherein said output device includes at least one of the following: storage, memory, network, printer or a display.

Example 113

The system of example 87, wherein said command instructions comprise instructions to an operating system (OS).

Example 114

The system of example 87, wherein said command instructions comprise database commands or structured query language (SQL) instructions.

Example 115

The system of example 87, wherein said command instructions comprise instructions to a format string interpreter.

Example 116

The system of example 87, wherein said command instructions comprise instruction to an LDAP interpreter.

Example 117

The system of example 87, wherein said command instructions comprise instruction to an XPATH interpreter.

Example 118

The system of example 87, wherein said command instructions comprise instructions to a web language.

Example 119

The system of example 87, wherein said command instructions comprise instructions to a scripting language interpreter.

Example 120

The system of example 87, wherein said command instructions comprise instructions to a NoSQL database.

Example 121

The system of example 87, wherein said command instructions include any combination of one or more of the following: instructions to an operating system (OS), instructions to a data base or instructions to an, SQL interpreter, instructions to a web based language; instructions to a format string interpreter; instructions to a LDAP, interpreter, instructions to an XPath interpreter, instructions to a scripting language, and instructions to a NoSQL database.

Example 122

The system of example 87, wherein said memory unit, said processor, and said client processor or client data memory are disposed within a single device.

Example 123

The system of example 122, wherein said device comprises: smart phone, laptop, computer notebook, iPad, PDA, PC, desktop, tablet, camera, gaming device, or television:

Example 124

The system of example 87, wherein said memory unit and said processor are remotely located from the client processor or client data memory.

Example 125

The system of example 124, wherein said processor is in communication with said client processor or client data memory by a wired network or a wireless network.

Example 126

An aspect of an embodiment of the present invention provides, but not limited thereto, a non-transitory computer readable medium including instructions executable by a processor for detecting command injection attacks. The instructions may comprise: receiving software code; extracting string fragments from the received software code to provide extracted signature fragments; receiving command instructions; converting the received command instructions into command fragments; identifying critical parts from the commands fragments; determining if the critical parts are untrusted or trusted by matching with the extracted signature fragments; identifying potential attacks upon the condition that a command includes critical parts that are untrusted; and communicating the identification of potential attacks to an output device.

Example 127

The non-transitory computer readable medium of example 126, wherein said output device includes at least one of the following: storage, memory, network, printer or a display.

Example 128

The non-transitory computer readable medium of example 126, wherein said instructions further comprise performing any of the steps recited in any one of examples 1-28

Example 129

An aspect of an embodiment of the present invention provides, but not limited thereto, a non-transitory computer readable medium including instructions executable by a processor for detecting command injection attacks. The instructions may comprise: receiving software code; receiving string fragments to provide signature fragments; receiving command instructions; converting the received command instructions into command fragments; identifying critical parts from the commands fragments; determining untrusted or trusted parts of the command instructions by using the signature fragments; identifying potential attacks upon the condition that a command includes critical parts that are untrusted; and communicating the identification of potential attacks to an output device.

Example 130

The non-transitory computer readable medium of example 129, wherein said output device includes at least one of the following: storage, memory, network, printer or a display.

Example 131

The non-transitory computer readable medium of example 129, wherein said instructions further comprise performing any of the steps recited in any one of examples 29-63.

REFERENCES

The following patents, applications and publications as listed below and throughout this document are hereby incorporated by reference in their entirety herein. The devices, systems, materials, compositions, networks, computer readable media, and methods of various embodiments of the invention disclosed herein may utilize aspects disclosed in the following references, applications, publications and patents and which are hereby incorporated by reference herein in their entirety (and which are not admitted to be prior art with respect to the present invention by inclusion in this section).

[1] The MITRE Corporation. "2011 CWE/SANS top 25 most dangerous software errors." [Online]. Available: http://cwe.mitre.org/top25/

[2] "CVE-2003-0041: MIT kerberos FTP client remote shell commands execution." 2003. [Online]. Available: http://cve.mitre.org/cgi-bin/cvename.cgi?name=CVE-2003-0041.

[3] "CVE-2007-3572: Yoggie Pico Pro remote code execution," 2007. [Online]. Available: http://cve.mitre.org/cgi-bin/cvename. name=CVE-2007-3572.

[4] "CVE-2010-1132: SpamAssassin mail filter: Arbitrary shell command injection," 2010. [Online]. Available: http://cve.mitre.org/cgi-bin/cvename.name=CVE-2010-1132.

[5] "CVE-2013-3568: Linksys CSRF+root command injection," 2013. [Online]. Available: http://cve.mitre.org/cgi-bin/cvename.cgi? name=CVE-2013-3568.

[6] B. Livshits. 'Dynamic taint tracking in managed runtimes," *Microsoft Research Technical Report.* 2012.

[7] E. Bosman, A. Slowinska, and H. Bos. "Minemu: the world's fastest taint tracker," in *Proceedings of the 14th International Conference on Recent Advances in Intrusion Detection,* ser. RAID '11. Berlin, Heidelberg: Springer-Verlag, 2011, pp. 1-20. [Online]. Available: http://dx.doi.org/10.1007/978-3-642-23644-O_1.

[8] F. Qin. C. Wang, Z. Li, H.-s. Kim, Y. Zhou, and Y. Wu, "Lift: A low-overhead practical information flow tracking system for detecting security attacks," in *Proceedings of the 39th Annual IEEE/ACM International Symposium on Microarchitecture,* ser. MICRO 39. Washington. D.C. USA: IEEE Computer Society. 2006, pp. 135-148. [Online]. Available: http://dx.doi.org/10.1 109/MICRO.2006.29,

[9] V. P. Kemerlis, G. Portokalidis, K. Jee. and A. D. Keromytis, "libdft: practical dynamic data flow tracking for commodity systems," in *Proceedings of the 8th ACM SIGPLAN/SIGOPS Conference on Virtual Execution Environments,* ser. VEE '12. New York. N.Y., USA: ACM, 2012, pp. 121-132. [Online]. Available: http://doi.acm.org/10.1145/2151024.2151042

[10] I. Papagiannis, M. Migliavacca, and P. Pietzuch. "PHP Aspis: using partial taint tracking to protect against injection attacks," in *2nd USENIX Conference on Web Application Development,* 2011. p. 13.

[11] T. Pielraszek and C. V. Bcrghe, "Defending against injection attacks through context-sensitive string evaluation," in *Recent Advances in Intrusion Detection*. Springer. 2006. pp. 124-145.

[12] A. Nguyen-tuong, S. Guarnieri, D. Greene, J. Shirley, and D. Evans, "Automatically hardening web applications using precise tainting," in *In 20th IFIP International Information Security Conference*. Springer, 2005, pp. 372-382.

[13] V. Haldar, D. Chandra, and M. Franz, "Dynamic taint propagation for java," in *In Proceedings of the 21st Annual Computer Security Applications Conference*, 2005, pp. 303-311.

[14] E. Chin and D. Wagner, "Efficient character-level taint tracking for Java." in *Proceedings of the 2009 ACM Workshop on Secure Web Services*. ser. SWS '09. New York. N.Y., USA: ACM. 2009. pp. 3-12. [Online]. Available: http://doi.acm.org/10.1145/1655121.1655125

[15] A. Futoransky, E. Gutesman, and A. Waissbein, "A dynamic technique for enhancing the security and privacy of web applications," *Proc. Black Hat USA, 2007*.

[16] W. Xu, S. Bhalkar, and R. Sekar, "Taint-enhanced policy enforcement: A practical approach to defeat a wide range of attacks," in *Proceedings of the 15th USENIX Security Symposium*, 2006, pp. 121-136.

[17] W. G. J. Halfond, A. Orso, and P. Manolios, "Using positive tainting and syntax-aware evaluation to counter SQL injection attacks," in *Proceedings of the 14th ACM SIGSOFT International symposium on Foundations of Software Engineering*, ser. SIGSOFT '06/FSE-14. New York. N.Y. USA: ACM, 2006. pp. 175-185. [Online]. Available: http://doi.acm.org/10.1145/1181775.1181797

[18] William G. J. Halfond, et al., "WASP: Protecting web applications using positive tainting and syntax-aware evaluation," *IEEE Transactions on Software Engineering*. vol. 34, no. 1, pp. 65-81, 2008.

[19] "Address space layout randomization." [Online]. Available: http://pax.grsecurity.net/docs/aslr.txt

[20) J. Newsome, "Dynamic taint analysis for automatic detection, analysis. and signature generation of exploits on commodity software," in *12th Annual Network and Distributed System Security Symposium*, 2005.

[21] R. Sekar, "An efficient black-box technique for defeating web application attacks," in *Network and Distributed System Security Symposium*. 2009.

[22] Z. Su and G. Wassermann, "The essence of command injection attacks in web applications," in *Conference Record of the 33rd ACM SIGPLAN-SIGACT Symposium on Principles of Programming Languages*, ser. POPL '06.' New York, N.Y., USA: ACM, 2006, pp. 372-382. [Online]. Available: http://doi.acm.org/10.1145/1111037.1111070

[23] Wikipedia, "Shotgun sequencing." [Online]. Available: http://en. wikipedia.org/wiki/Shotgun sequencing

[24] S. Sidiroglou, M. E. Locasto, S. W. Boyd, and A. D. Keromytis, "Building a reactive immune system for software services," in *Proceedings of the Annual Conference on USENIX Annual Technical Conference*, ser. ATEC '05. Berkeley, Calif., USA: USENIX Association, 2005, pp. 11-11. [Online]. Available: http://dl.acm.org/citation.cfm?id=1247360.1247371

[25] S. Sidiroglou, G. Giovanidis, and A. D. Keromytis, "A dynamic mechanism for recovering from buffer overflow attacks," in *Information security*. Springer, 2005. pp. 1-15.

[26] J. Hiser, A. Nguyen-Tuong, M. Co, M. Hall, and J. W. Davidson, "Ilr: Where'd my gadgets go?" in *Proceedings of the 2012 IEEE Symposium on Security and Privacy*, ser. SP '12. Washington, D.C., USA: IEEE Computer Society, 2012, pp. 571-585. [Online]. Available: http://dx.doi.org/10.1109/SP.2012.39

[27] J. D. Hiser, C. L. Coleman, M. Co. and J. W. Davidson, "MEDS: The memory error detection system," in *Proceedings of the 1st International Symposium on Engineering Secure Software and Systems*, ser. ESSoS '09. Berlin, Heidelberg: Springer-Verlag. 2009. pp. 164-179. [Online]. Available: http://dx.doi.org/10.1007/978-3-642-00199-4 14

[28] G. C. F. Greve, M. Brown, and D. Nelson, "SpamAssassin milter plugin," 2013. [Online]. Available: http://savannah.nongnu.org/projects/spamass-milt/

[29] J. Coppens, "cbrPager," 2013. [Online]. Available: http://jcoppens.com/sofi/cbrpager/index.en.php

[30] J. Seward. "bzip2," 2013. [Online]. Available: http://www.bzip.org

[31] C. Dickens, *A Tale of Two Cities*. Project Gutenberg, 1859. [Online]. Available: http://www.gutenberg.org/files/98/98.txt

[32] "CVE-2008-2575: cbrPager: Arbitrary command execution via shell metacharacters," 2008. [Online]. Available: http://cve.mitre.org/cgi-bin/cvename.cgi?name=CVE-2008-2575

[33] The MITRE Corporation, "Common weakness enumeration." [Online]. Available: http://cwe.mitre.org/

[34] "The perl programming language." [Online]. Available: http://www.perl.org

[35] "Ruby." [Online]. Available: http://www.ruby-lang.org

[36] "Wordpress." [Online]. Available: http://www.wordpress.org

[37] N. Nethercote and J. Seward, "Valgrind: a framework for heavyweight dynamic binary instrumentation," in *Proceedings of the 2007 ACM SIGPLAN Conference on Programming Language Design and Implementation*, ser. PLDI '07. New York, N.Y., USA: ACM. 2007. pp. 89-100. [Online]. Available: http://doi.acm.org/10.1145/1250734. 1250746

[38] P. Saxena, R. Sekar, and V. Puranik, "Efficient fine-grained binary instnimcntation with applications to taint-tracking," in *Proceedings of the 6th Annual IEEE/ACM International Symposium on Code Generation and Optimization*, ser. CGO '08. New York. N.Y., USA: ACM, 2008. pp. 74-83. [Online]. Available: 1http://doi.acm.org/10. 1145/1356058.1356069

[39] J. Clause, W. Li, and A. Orso, "Dylan: a generic dynamic taint analysis framework," in *Proceedings of the 2007 International Symposium on Software Testing and Analysis*, ser. ISSTA '07. New York, N.Y., USA: ACM, 2007, pp. 196-206. [Online]. Available: http://doi.acm.org/10.1145/1273463.1273490

[40] M. Co, J. W. Davidson, J. D. Hiser, J. C. Knight, A. Nguyen-Tuong, D. Cok, D. Gopan, D. Mclski, W. Lee, C. Song, T. Bracewcll, D. Hyde, and B. Mastropietro, "PEASOUP: Preventing exploits against software of uncertain provenance (position paper)," in *Proceedings of the 7th International Workshop on Software Engineering for Secure Systems*, ser. SESS '11. New York. N.Y. USA: ACM, 2011. pp. 43-49. [Online]. Available: http://doi.acm.org/10.1145/1988630.1988639

[41] A. S. Christensen, A. Moller, and M. I. Schwartzbach, *Precise analysis of string expressions*. Springer. 2003.

[42] W. G. J. Halfond and A. Orso, "AMNESIA: analysis and monitoring for neutralizing SQL-injection attacks." in *Proceedings of the 20th IEEE/ACM international Conference on Automated Software Engineering*, ser. ASE '05. New York, N.Y., USA: ACM, 2005, pp. 174-183. [Online]. Available: http://doi.acm.org/10.1145/1101908.1101935

[43] M. Christodorescu, N. Kidd, and W.-H. Goh, "String analysis for x86 binaries," in *Proceedings of the 6th ACM SICPLAN-SIGSOFT Workshop on Program Analysis for Software Tools and Engineering*, ser. Paste 05, New York, N.Y. USA. ACM, 2005, pp. 88-95. [Online]. Available: http://doi.acm.org/10.1145/1108792.1108814

[44] OWASP Top 10 Application Security Risks—2010 https://www.owasp.org/index.php/Top_10_2010-Main

[45] 2011 CWE/SANS Top 25 Most Dangerous Software Errors http://cwe.mitre.org/top25/

[46] *Automatically Hardening Web Applications Using Precise Tainting* Anh Nguyen-Tuong, Salvatore Guarnieri, Doug Greene, Jeff Shirley, David Evans. http://www-.cs.virginia.edu/-evans/pubs/infosec05.pdf

[47] *Twentieth IFIP International Information Security Conference* (SEC 2005). 30 May-1 Jun. 2005, Chiba, Japan

[48] Programming languages that support taint propagation: Perl, Ruby http://en.wikipedia.org/wiki/Taint_checking

[49] International Patent Application Serial No. PCT/US2006/026932, Davidson, et al., "Method and System for Software Protection Using Binary Encoding", filed Jul. 11, 2006; International Patent Application Publication No. WO 2007/008919, published Jan. 18, 2007.

[50] U.S. patent application Ser. No. 11/995,272, Davidson, et al., "Method and System for Software Protection Using Binary Encoding", filed Feb. 29, 2008; U.S. Patent Application Publication No. US 2009/0144561, published Jun. 4, 2009.

[51] International Patent Application No. PCT/US2008/087712, Davidson, et al., "System and Related Method for Protecting Software Via Continuous Anti-Tampering and Obfuscation Transforms", filed Dec. 19, 2008; International Patent Application Publication No. WO 2009/108245, published Sep. 3, 2009.

[52] U.S. patent application Ser. No. 12/809,627, Davidson, et al., "Method and System for Software Protection Using Binary Encoding", filed Jun. 21, 2010; U.S. Patent Application Publication No. US 2011/0035601, published Feb. 10, 2011.

[53] International Patent Application Serial No. PCT/US2013/027944, Hiser, et al., "Method of Instruction Location Randomization (ILR) and Related System", filed Feb. 27, 2013; International Patent Application Publication No. WO 2013/130548, published Sep. 6, 2013.

[54] U.S. Patent Application Publication No. US 2012/0026881 A1, Zuk, et al., "Packet Classification in a Network Security Device", Feb. 2, 2012.

[55] U.S. Patent Application Publication No. US 2004/0098617 A1, Sekar, R., "Specification-Based Anomaly Detection", May 20, 2004.

[56] U.S. Patent Application Publication No. US 2007/0297333 A1, Zuk, et al., "Packet Classification in a Network Security Device", Dec. 27, 2007.

[57] 14. U.S. Patent Application Publication No. US 2008/0047012 A1, Rubin, et al., "Network Intrusion Detector with Combined Protocol Analyses, Normalization and Matching", Feb. 21, 2008.

[58] U.S. Pat. No. 8,042,182 B2, Milani Comparetti et al., "Method and System for Network Intrusion Detection, Related Network and Computer Program Product.

[59] U.S. Pat. No. 7,454,609 B2, Janes, S., "Network Communications Security Agent", Nov. 18, 2008.

[60] U.S. Pat. No. 7,266,682 B1, Janes, S., "Network Communications Security Agent", Sep. 4, 2007.

[61] U.S. Pat. No. 7,234,168, Gupta, et al., "Hierarchy-Based Method and Apparatus for Detecting Attacks on a Computer System", Jun. 19, 2007.

[62] U.S. Pat. No. 7,603,395 B2, Steinmaier, et al., "Client-Server System, A Generator Unit and a Method to Customize a User Application", Oct. 13, 2009.

[63] U.S. Pat. No. 7,366,170, Umesawa, et al., "Communication Connection Method, Authentication Method, Server Computer, Client Computer and Program", Apr. 29, 2008.

[64] U.S. Pat. No. 7,174,458 B2, Araki, et al., "Method of and Apparatus for Authenticating Client Terminal by Making use of Port Access", Feb. 6, 2007.

[65] U.S. Pat. No. 7,006,993 B1, Cheong, et al., "Method and Apparatus for Surrogate Control of Network-Based Electronic Transactions", Feb. 28, 2006.

[66] U.S. Pat. No. 6,910,135 B1, Grainger, S., "Method and Apparatus for an Intruder Detection Reporting and Response System", Jun. 21, 2005.

[67] U.S. Pat. No. 6,263,442 B1, Mueller, et al., "System and Method for Securing a Program's Execution in a Network Environment", Jul. 17, 2001.

[68] U.S. Patent Application Publication No. US 2008/0271143 A1, Stephens, et al., "Insider Threat Detector", Oct. 30, 2008.

[69] U.S. Pat. No. 8,032,937 B2, Ellis, D., "Method, Apparatus and Computer Program Product for Detecting Computer Worms in a Network", Oct. 4, 2011.

[70] International Patent Application Publication No. WO 2012/154658 A2, Krishnan, et al., "Methods, Systems and Computer Readable Media for Efficient Computer Forensic Analysis and Data Access Control", Nov. 15, 2012.

[71] International Patent application Publication No. WO 2011/130510 A1, Olney, et al., "System and Method for Near-Real Time Network Attack Detection, and System and Method for Unified Detection Via Detection Routing, Oct. 20, 2011.

The references listed above, as well as all references cited in the specification, including patents, patent applications, journal articles, and all database entries, are incorporated herein by reference to the extent that they supplement, explain, provide a background for, or teach methodology, techniques, and/or compositions employed herein (and which are not admitted to be prior art with respect to the present invention by inclusion in this section).

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A computer method for detecting command injection attacks, said method comprising:
   receiving software code;
   extracting string fragments from said received software code to provide extracted signature fragments;
   receiving command instructions;
   converting the received command instructions into command fragments;
   identifying critical parts from said command fragments;
   determining if said critical parts are untrusted or trusted by matching with said extracted signature fragments;
   identifying potential attacks upon the condition that a command includes critical parts that are untrusted; and
   communicating said identification of potential attacks to an output device, wherein the command fragments are different from external data processed by the software code, and the critical parts of the command fragments do not originate from previously identified command fragments.

2. The method of claim 1, further comprises:
   remediating or rejecting one or more of said identified potential attack commands.

3. The method of claim 2, wherein said remediation includes altering the identified potential attack command.

4. The method of claim 2, further comprising:
   transmitting said remediated command to a command interpreter module.

5. The method of claim 4, further comprising:
   executing said remediated command in said command interpreter; and
   generating a command response.

6. The method of claim 2, further comprising:
   transmitting said remediated command for execution; and
   generating said executed command as a command response.

7. The method of claim 2, wherein said remediation of said identified potential attack command includes providing one or more of the following instructions:
   terminating the software program,
   repairing the potential attack command,
   enabling additional system monitoring,
   enabling additional analysis,
   logging that a suspicious command is being attempted,
   alerting a supervisory remote computer that a breach is being attempted,
   notifying an administrator of the suspicious command,
   not issuing the command but returning an error code,
   not issuing the command but returning a non-error code,
   issuing a known bad command and returning the resulting error codes,
   displaying an alert to the end user, or
   any combination thereof.

8. The method of claim 1, wherein said identifying critical parts includes at least one of the following: parsing, dissecting, lexical analyzing, or tokenizing.

9. The method of claim 1, wherein said extracting comprises a string extracting technique, and said method further comprises:
   post-processing of said extracted signature fragments.

10. The method of claim 9, wherein said post-processing may comprise one or more of the following:
    removing said extracted signature fragments;
    adding said extracted signature fragments;
    modifying said extracted signature fragments; or
    annotating said extracted signature fragments with additional information.

11. The method of claim 1, wherein said identifying potential attacks includes using annotations.

12. The method of claim 11, wherein said annotations are generated by said post-processing step.

13. The method of claim 1, wherein said signature fragments specify patterns.

14. The method of claim 13, wherein said patterns comprise one or more of the following:
    regular expressions,
    wild-card specifiers,
    format string specifiers,
    context-free grammars, or
    grammars.

15. The method of claim 1, wherein if the condition to identify that potential attacks have occurred has not been satisfied then said command is deemed as safe.

16. The method of claim 15, further comprising:
    transmitting said safe command to a command interpreter module.

17. The method of claim 16, further comprising:
    executing said safe command; and
    generating a command response.

18. The method of claim 15, further comprising accepting said safe command.

19. The method of claim 1, wherein said output device includes at least one of the following: storage, memory, network, printer or a display.

20. The method of claim 1, wherein said command instructions comprise instructions to an operating system (OS).

21. The method of claim 1, wherein said command instructions comprise database commands or structured query language (SQL) instructions.

22. The method of claim 1, wherein said command instructions comprise instructions to a format string interpreter.

23. The method of claim 1, wherein said command instructions comprise instruction to an LDAP interpreter.

24. The method of claim 1, wherein said command instructions comprise instruction to an XPATH interpreter.

25. The method of claim 1, wherein said command instructions comprise instructions to a web language.

26. The method of claim 1, wherein said command instructions comprise instructions to a scripting language interpreter.

27. The method of claim 1, wherein said command instructions comprise instructions to a NoSQL database.

28. The method of claim 1, wherein said command instructions include any combination of one or more of the following: instructions to an operating system (OS), instructions to a data base or instructions to an, SQL interpreter, instructions to a web based language; instructions to a format string interpreter; instructions to a LDAP, interpreter, instructions to an XPath interpreter, instructions to a scripting language, and instructions to a NoSQL database.

29. A computer method for detecting command injection attacks, said method comprising:
receiving software code;
receiving string fragments to provide signature fragments;
receiving command instructions;
converting the received command instructions into command fragments;
identifying critical parts from said command fragments;
determining untrusted or trusted parts of the command instructions by using said signature fragments;
identifying potential attacks upon the condition that a command includes critical parts that are untrusted; and
communicating said identification of potential attacks to an output device, wherein the command fragments are different from external data processed by the software code, and the critical parts of the command fragments do not originate from previously identified command fragments.

30. The method of claim 29, wherein said receiving string fragments further comprises extracting string fragments from said received software.

31. The method of claim 29, wherein said receiving string fragments includes one or more of any of the following:
receiving from the software developer,
downloading from a networked resource,
distributed with the software,
manually specifying string fragments, or
static or dynamic analysis of the software code.

32. The method of claim 29, further comprises:
monitoring, remediating or rejecting one or more of said identified potential attack commands.

33. The method of claim 32, wherein said remediation includes altering the identified potential attack command.

34. The method of claim 32, further comprising:
transmitting said remediated command to a command interpreter module.

35. The method of claim 34, further comprising:
executing said remediated command in said command interpreter; and
generating a command response.

36. The method of claim 32, further comprising:
transmitting said remediated command for execution; and
generating said executed command as a command response.

37. The method of claim 32, wherein said monitoring, remediation or rejection of said identified potential attack command includes performing one or more of the following actions:
terminating the software program,
repairing the potential attack command,
enabling additional system monitoring,
enabling additional analysis,
logging that a suspicious command is being attempted,
alerting a supervisory remote computer that a breach is being attempted,
notifying an administrator of the suspicious command,
not issuing the command but returning an error code,
not issuing the command but returning a non-error code,
issuing a known bad command and returning the resulting error codes,
displaying an alert to the end user, or
any combination thereof.

38. The method of claim 29, wherein said identifying critical parts includes at least one of the following: parsing, dissecting, scanning, tokenizing, or lexical analysis.

39. The method of claim 29, further comprising post-processing of said received string fragments.

40. The method of claim 39, wherein said post-processing may comprise one or more of the following:
removing some of said string fragments;
adding additional fragments to said string fragments;
modifying said string fragments; or
annotating said string fragments with additional information.

41. The method of claim 29, wherein said determining untrusted or trusted parts of the command instructions includes using a trust-verification policy.

42. The method of claim 41, wherein said trust-verification policy includes ensuring that certain critical parts of said command instructions exactly match one signature fragment.

43. The method of claim 29, wherein said identifying potential attacks includes using a trust-verification policy.

44. The method of claim 43, wherein said trust-verification policy includes ensuring that certain critical parts of said command instructions exactly match one signature fragment.

45. The method of claim 40, wherein said identifying potential attacks includes using annotations.

46. The method of claim 29, wherein said identifying potential attacks includes using annotations.

47. The method of claim 45, wherein said annotations are generated by said post-processing step.

48. The method of claim 29, wherein said signature fragments specify patterns.

49. The method of claim 48, wherein said patterns comprise one or more of the following:
regular expressions,
wild-card specifiers,
format string specifiers,
context-free grammars, or
grammars.

50. The method of claim 29, wherein if the method of identifying potential attacks results in no potential attacks then said command is deemed as safe.

51. The method of claim 50, further comprising:
transmitting said safe command to a command interpreter module.

52. The method of claim 51, further comprising:
executing said safe command; and
generating a command response.

53. The method of claim 50, further comprising accepting said safe command.

54. The method of claim 29, wherein said output device includes at least one of the following: storage, memory, network, printer or a display.

55. The method of claim 29, wherein said command instructions comprise instructions to an operating system (OS).

56. The method of claim 29, wherein said command instructions comprise database commands or structured query language (SQL) instructions.

57. The method of claim 29, wherein said command instructions comprise instructions to a format string interpreter.

58. The method of claim 29, wherein said command instructions comprise instruction to an LDAP interpreter.

59. The method of claim 29, wherein said command instructions comprise instruction to an XPATH interpreter.

60. The method of claim 29, wherein said command instructions comprise instructions to a web language.

61. The method of claim 29, wherein said command instructions comprise instructions to a scripting language interpreter.

62. The method of claim 29, wherein said command instructions comprise instructions to a NoSQL database.

63. The method of claim 29, wherein said command instructions include any combination of one or more of the following: instructions to an operating system (OS), instructions to a data base or instructions to an, SQL interpreter, instructions to a web based language; instructions to a format string interpreter; instructions to a LDAP, interpreter, instructions to an XPath interpreter, instructions to a scripting language, and instructions to a NoSQL database.

64. A non-transitory computer readable medium including instructions executable by a processor for detecting command injection attacks, said instructions comprising:
receiving software code;
extracting string fragments from said received software code to provide extracted signature fragments;
receiving command instructions;
converting the received command instructions into command fragments;
identifying critical parts from said command fragments;
determining if said critical parts are untrusted or trusted by matching with said extracted signature fragments;
identifying potential attacks upon the condition that a command includes critical parts that are untrusted; and
communicating said identification of potential attacks to an output device, wherein the command fragments are different from external data processed by the software code, and the critical parts of the command fragments do not originate from previously identified command fragments.

65. The non-transitory computer readable medium of claim 64, wherein said output device includes at least one of the following: storage, memory, network, printer or a display.

66. The non-transitory computer readable medium of claim 64, wherein said instructions further comprises remediating or rejecting one or more of said identified potential attack commands.

67. A non-transitory computer readable medium including instructions executable by a processor for detecting command injection attacks, said instructions comprising:
receiving software code;
receiving string fragments to provide signature fragments;
receiving command instructions;
converting the received command instructions into command fragments;
identifying critical parts from said command fragments;
determining untrusted or trusted parts of the command instructions by using said signature fragments;
identifying potential attacks upon the condition that a command includes critical parts that are untrusted; and
communicating said identification of potential attacks to an output device, wherein the command fragments are different from external data processed by the software code, and the critical parts of the command fragments do not originate from previously identified command fragments.

68. The non-transitory computer readable medium of claim 67, wherein said output device includes at least one of the following: storage, memory, network, printer or a display.

69. The non-transitory computer readable medium of claim 67, wherein said instructions further comprises extracting string fragments from said received software.

* * * * *